United States Patent
Li et al.

(10) Patent No.: US 11,979,591 B2
(45) Date of Patent: May 7, 2024

(54) UNIFIED NEURAL NETWORK IN-LOOP FILTER

(71) Applicant: Lemon Inc., Grand Cayman (KY)

(72) Inventors: Yue Li, San Diego, CA (US); Li Zhang, San Diego, CA (US); Kai Zhang, San Diego, CA (US)

(73) Assignee: LEMON INC.

( * ) Notice: Subject to any disclaimer, the term of this patent is extended or adjusted under 35 U.S.C. 154(b) by 0 days.

(21) Appl. No.: 17/714,014

(22) Filed: Apr. 5, 2022

(65) Prior Publication Data

US 2022/0329836 A1 Oct. 13, 2022

Related U.S. Application Data

(60) Provisional application No. 63/171,225, filed on Apr. 6, 2021.

(51) Int. Cl.
| | |
|---|---|
| *H04N 19/436* | (2014.01) |
| *H04N 19/124* | (2014.01) |
| *H04N 19/132* | (2014.01) |
| *H04N 19/154* | (2014.01) |
| *H04N 19/169* | (2014.01) |
| *H04N 19/172* | (2014.01) |

(Continued)

(52) U.S. Cl.
CPC ......... *H04N 19/436* (2014.11); *H04N 19/124* (2014.11); *H04N 19/132* (2014.11); *H04N 19/154* (2014.11); *H04N 19/172* (2014.11); *H04N 19/186* (2014.11); *H04N 19/1883* (2014.11); *H04N 19/30* (2014.11); *H04N 19/70* (2014.11); *H04N 19/82* (2014.11)

(58) Field of Classification Search
CPC .. H04N 19/436; H04N 19/124; H04N 19/132; H04N 19/154; H04N 19/172; H04N 19/186; H04N 19/1883; H04N 19/30; H04N 19/70; H04N 19/82
See application file for complete search history.

(56) References Cited

U.S. PATENT DOCUMENTS

2020/0327702 A1   10/2020   Wang et al.
2020/0382793 A1*  12/2020   Gao ............... H04N 19/176
(Continued)

FOREIGN PATENT DOCUMENTS

CN   110971915 A   4/2020
CN   111064958 A   4/2020
(Continued)

OTHER PUBLICATIONS

Suehring, K., https://vcgit.hhi.fraunhofer.de/jvet/VVCSoftware_VTM/-/tags/VTM-10.0, Jul. 15, 2022, 2 pages.
(Continued)

*Primary Examiner* — Jae N Noh
(74) *Attorney, Agent, or Firm* — Conley Rose, P.C.

(57) ABSTRACT

A method implemented by a video coding apparatus includes applying a neural network (NN) filter to an unfiltered sample of a video unit to generate a filtered sample, wherein the NN filter is based on an NN filter model generated using a quality-level indicator (QI) input. The method also includes converting between a video media file and a bitstream based on the filtered sample that was generated.

20 Claims, 20 Drawing Sheets

(51) Int. Cl.
  *H04N 19/186* (2014.01)
  *H04N 19/30* (2014.01)
  *H04N 19/70* (2014.01)
  *H04N 19/82* (2014.01)

(56) References Cited

U.S. PATENT DOCUMENTS

| 2021/0044811 A1* | 2/2021 | Hodgkinson | H04N 19/136 |
| 2022/0038721 A1* | 2/2022 | Li | H04N 19/186 |
| 2022/0295116 A1 | 9/2022 | Ma | |

FOREIGN PATENT DOCUMENTS

| CN | 111133756 A | 5/2020 |
| CN | 112422993 A | 2/2021 |
| WO | 2021051369 A1 | 3/2021 |
| WO | 2021211966 A1 | 10/2021 |

OTHER PUBLICATIONS

Bossen, F., https://vcgit.hhi.fraunhofer.de/jvet/VVCSoftware_VTM/-/tags/VTM-11.0 Jul. 15, 2022, 1 page.

Bross, et al., "Versatile Video Coding (Draft 10)," Document: JVET-S2001-vH, Joint Video Experts Team (JVET) of ITU-T SG 16 WP 3 and ISO/IEC JTC 1/SC 29/WG 11, 19th Meeting: by teleconference, Jun. 22-Jul. 1, 2020, 548 pages.

Bosen, Ed., et. al., "VTM Software Manual," Document: JVET—Software Manual, Joint Video Experts Team (JVET) of ITU-T SG16 WP3 and ISO/IEC JTC1/SC29/WG11, Aug. 13, 2020, 46 pages.

Lim, et al., "CE2: Subsampled Laplacian calculation (Test 6.1, 6.2, 6.3, and 6.4)," Document JVET-L0147, Joint Video Experts Team (JVET) of ITU-T SG 16 WP 3 and ISO/IEC JTC 1/SC 29/WG 11, 12th Meeting: Macao, CN, Oct. 3-12, 2018, 8 pages.

Taquet, et al., "CE5: Results of tests CE5-3.1 to CE5-3.4 on Non-Linear Adaptive Loop Filter," Document JVET-N0242, Joint Video Experts Team (JVET) of ITU-T SG 16 WP 3 and ISO/IEC JTC 1/SC 29/WG 11, 14th Meeting: Geneva, CH, Mar. 19-27, 2019, 10 pages.

Balle, et. al., "End-to-end optimization of nonlinear transform codes for perceptual quality," In PCTS. IEEE, 2016, pp. 1-5.

Theis, et. al., "Lossy Image Compression with Compressive Autoencoders," ICLR 2017, arXiv:1703.00395v1 [stat. MIL], Mar. 1, 2017, 19 pages.

Li, et. al., "Fully Connected Network-Based Intra Prediction for Image Coding," IEEE Transaction on Image Processing, vol. 27, Issue 7, 2018, pp. 3236-3247.

Dai, et. al., "A Convolutional Neural Network Approach for Post-Processing in HEVC Intra Coding," MMM, Springer, arXiv:1608.06690v2 [cs.MM], Oct. 29, 2016, pp. 28-39.

Song, et. al., "Neural Network-Based Arithmetic Coding of Intra Prediction Modes in HEVC," VCIP 2017, IEEE, Dec. 10-13, 2017, 4 pages.

Pfaff, et al., "Neural network based intra prediction for video coding," In Applications of Digital Image Processing XLI, vol. 10752. International Society for Optics and Photonics, 1075213, 7 pages.

Li, et al., "AHG11: Convolutional Neural Network-based In-Loop Filter with Adaptive Model Selection," Document: JVET-U0068-v2, Joint Video Experts Team (JVET) of ITU-T SG 16 WP 3 and ISO/IEC JTC 1/SC 29, 21st Meeting, by teleconference, Jan. 6-15, 2021, 5 pages.

Liu, et al., "JVET common test conditions and evaluation procedures for neural network-based video coding technology," Document: JVET-U2016-r1, Joint Video Experts Team (JVET) of ITU-T SG 16 WP 3 and ISO/IEC JTC 1/ SC 29/WG 11 21st Meeting, by teleconference, Jan. 6-15, 2021, 10 pages.

Timofte, et al., "DIV2K dataset: DIVerse 2K resolution high quality images as used for the challenges @ NTIRE (CVPR 2017 and CVPR 2018) and @ PIRM (ECCV 2018)," https://data.vision.ee.ethz.ch/cvl/DIV2K/, 6 pages.

Ma, et al., "BVI-DVC: A Training Database for Deep Video Compression," arXiv:2003.13552v2 [33ss.IV] Oct. 8, 2020, 11 pages.

Non-Final office Action dated Jun. 8, 2023, 27 pages, U.S. Appl. No. 17/720,125, filed Apr. 13, 2022.

* cited by examiner

700

| $p3_0$ | $p2_0$ | $p1_0$ | $p0_0$ | $q0_0$ | $q1_0$ | $q2_0$ | $q3_0$ |
| $p3_1$ | $p2_1$ | $p1_1$ | $p0_1$ | $q0_1$ | $q1_1$ | $q2_1$ | $q3_1$ |
| $p3_2$ | $p2_2$ | $p1_2$ | $p0_2$ | $q0_2$ | $q1_2$ | $q2_2$ | $q3_2$ |
| $p3_3$ | $p2_3$ | $p1_3$ | $p0_3$ | $q0_3$ | $q1_3$ | $q2_3$ | $q3_3$ |
| $p3_4$ | $p2_4$ | $p1_4$ | $p0_4$ | $q0_4$ | $q1_4$ | $q2_4$ | $q3_4$ |
| $p3_5$ | $p2_5$ | $p1_5$ | $p0_5$ | $q0_5$ | $q1_5$ | $q2_5$ | $q3_5$ |
| $p3_6$ | $p2_6$ | $p1_6$ | $p0_6$ | $q0_6$ | $q1_6$ | $q2_6$ | $q3_6$ |
| $p3_7$ | $p2_7$ | $p1_7$ | $p0_7$ | $q0_7$ | $q1_7$ | $q2_7$ | $q3_7$ | first 4 lines (rows 0–3)
second 4 lines (rows 4–7)

FIG. 7

Residual block

UNIFIED NEURAL NETWORK IN-LOOP FILTER

CROSS-REFERENCE TO RELATED APPLICATIONS

This patent application claims the benefit of U.S. Provisional Patent Application No. 63/171,225 filed Apr. 6, 2021, by Lemon, Inc., and titled "On Designing Unified Neural Network For In-Loop Filtering For Video Coding," which is hereby incorporated by reference.

TECHNICAL FIELD

The present disclosure is generally related to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments provide one or more neural network (NN) filter models trained as part of an in-loop filtering technology or filtering technology used in a post-processing stage for reducing the distortion incurred during compression. In addition, samples with different characteristics are processed by different NN filter models. Further, a unified NN filter model can be generated by providing at least one indicator, which may be a quality-level indicator, as an input to a NN filter.

A first aspect relates to a method implemented by a coding apparatus. The method includes applying a neural network (NN) filter to an unfiltered sample of a video unit to generate a filtered sample, wherein the NN filter is based on an NN filter model generated using a quality-level indicator (QI) input. The method also includes converting between a video media file and a bitstream based on the filtered sample that was generated.

Optionally, in any of the preceding aspects, another implementation of the aspect provides that the QI input comprises a quantization parameter (QP) of the video unit.

Optionally, in any of the preceding aspects, another implementation of the aspect provides that the QI input comprises a quantization parameter (QP) of a sequence that includes the video unit.

Optionally, in any of the preceding aspects, another implementation of the aspect provides that the QI input comprises a quantization parameter (QP) of a picture or slice that includes the video unit.

Optionally, in any of the preceding aspects, another implementation of the aspect provides that the QI input comprises an output of a quantization process applied to the video unit, wherein the quantization process is based on a quantization parameter (QP) of the video unit, a QP of a sequence that includes the video unit, or a QP of a picture or slice that includes the video unit.

Optionally, in any of the preceding aspects, another implementation of the aspect provides spanning the quality-level indicator into a two-dimensional array having a same size as the video unit, wherein the two-dimensional array is an additional input plane to the NN filter.

Optionally, in any of the preceding aspects, another implementation of the aspect provides that the video unit is a coding tree unit (CTU) or a coding unit (CU).

Optionally, in any of the preceding aspects, another implementation of the aspect provides that the QI input is fed into a plurality of fully-connected layers of the NN filter to expand the QI input into a one-dimensional vector, and wherein elements of the one-dimensional vector are channel-wise scaling factors used to recalibrate features maps of the NN filter model.

Optionally, in any of the preceding aspects, another implementation of the aspect provides that the feature maps of the NN filter model are given by $f \in R^{N \times W \times H}$, where N represents the channel numbers, W represents the channel width, and H represents the channel height, wherein the one-dimensional vector provided by the fully-connected layers is represented by $S \in R^N$, and wherein the recalibrated feature maps are generated according to $F^{i,j,k} = f^{i,j,k} \times S_i$, $1 \le i \le N$, $1 \le j \le W$, $1 \le k \le H$, where F represents the recalibrated feature maps.

Optionally, in any of the preceding aspects, another implementation of the aspect provides signaling the quality-level indicator to a decoder using one selected from the group consisting of: a sequence parameter set (SPS), a picture parameter set (PPS), a picture header, a slice header, a coding tree unit (CTU), and a coding unit (CU).

Optionally, in any of the preceding aspects, another implementation of the aspect provides that the video unit comprises first and second color components, wherein the QI input indicates a quality of the first color component, and wherein the NN filter is applied to the first and second color components to generate the filtered sample.

Optionally, in any of the preceding aspects, another implementation of the aspect provides that the video unit comprises first and second color components, wherein the QI input comprises a first QI that indicates a quality of the first color component and a second QI that indicates a quality of the second color component, and wherein the first QI is applied to the first color component and the second QI is applied to the second color component to generate the filtered sample.

Optionally, in any of the preceding aspects, another implementation of the aspect provides that the video unit comprises first and second color components, wherein the QI input indicates a quality of the first color component, and wherein the NN filter is applied only to the first color component to generate the filtered sample.

Optionally, in any of the preceding aspects, another implementation of the aspect provides that the QI indicates a quality of a region or picture that includes the video unit.

Optionally, in any of the preceding aspects, another implementation of the aspect provides that the QI indicates a quality of a region or picture that does not include the video unit.

Optionally, in any of the preceding aspects, another implementation of the aspect provides that the video unit refers to the region or picture.

Optionally, in any of the preceding aspects, another implementation of the aspect provides that the conversion comprises generating the bitstream according to the video media file.

Optionally, in any of the preceding aspects, another implementation of the aspect provides that the conversion comprises parsing the bitstream to obtain the video media file.

A second aspect relates to an apparatus for coding video data comprising a processor and a non-transitory memory with instructions thereon, wherein the instructions upon execution by the processor cause the processor to: apply a neural network (NN) filter to an unfiltered sample of a video unit to generate a filtered sample, wherein the NN filter is based on an NN filter model generated using a quality-level indicator (QI) input; and convert between a video media file and a bitstream based on the filtered sample that was generated.

A third aspect relates to a non-transitory computer readable medium storing a bitstream of a video that is generated by a method performed by a video processing apparatus. The method performed by the video processing apparatus includes applying a neural network (NN) filter to an unfiltered sample of a video unit to generate a filtered sample, wherein the NN filter is based on an NN filter model generated using a quality-level indicator (QI) input; and generating the bitstream based on the filtered sample that was generated.

A fourth aspect relates to a method for storing a bitstream of a video that is performed by a video processing apparatus. The method performed by the video processing apparatus includes applying a neural network (NN) filter to an unfiltered sample of a video unit to generate a filtered sample, wherein the NN filter is based on an NN filter model generated using a quality-level indicator (QI) input; and generating the bitstream based on the filtered sample that was generated.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is an example of pixels involved in filter on/off decision and strong/weak filter selection.

DETAILED DESCRIPTION

Figure 1:
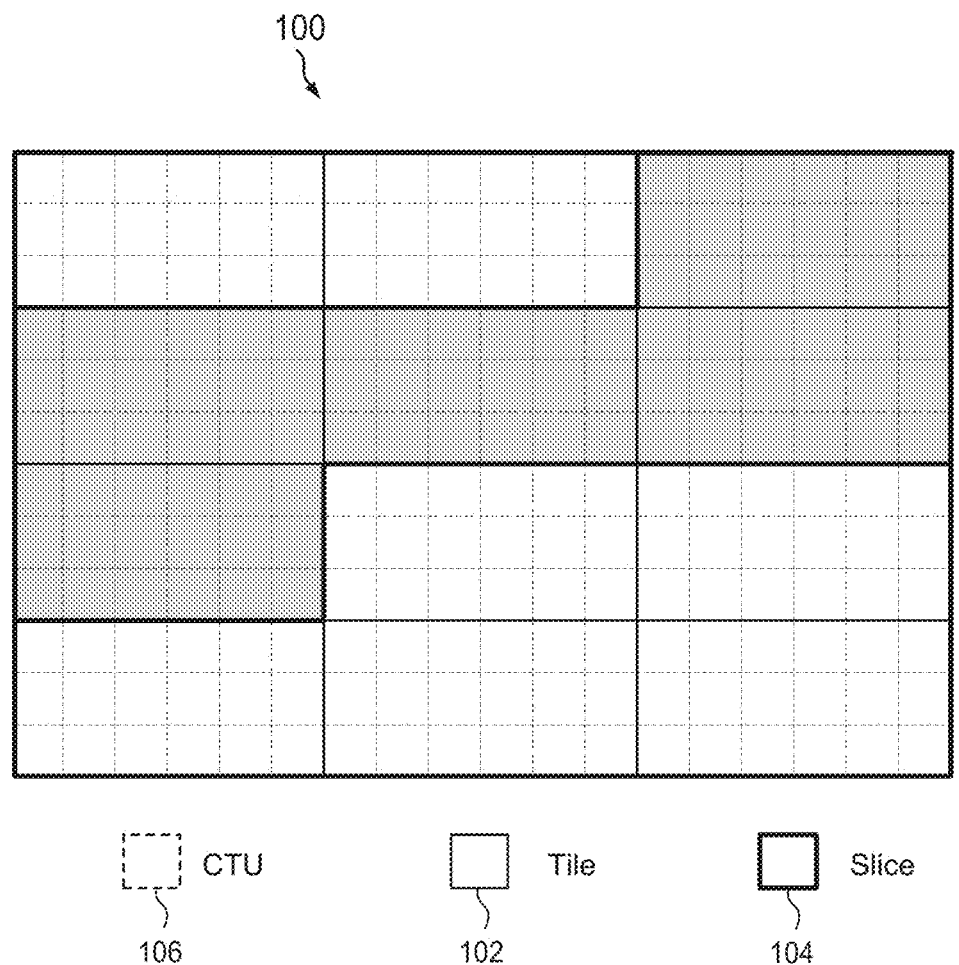
FIG. 1 is an example of raster-scan slice partitioning of a picture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Versatile Video Coding (VVD), also known as H.266, terminology is used in some description only for ease of understanding and not for limiting scope of the disclosed techniques. As such, the techniques described herein are applicable to other video codec protocols and designs also.

This patent document is related to video coding. Specifically, this description is related to a loop filter in image/video coding. The disclosed examples may be applied individually or in various combinations, for video bitstreams coded using existing video coding standards, such as the VVC standard, the High-Efficiency Video Coding (HEVC) standard, or the standards to be finalized (e.g., third-generation Audio Video Coding Standard (AVS3)). The disclosed examples may also be applicable to future video coding standards, future video codecs, or as a post-processing method outside of an encoding/decoding process.

Video coding standards have evolved primarily through the development of the well-known International Telecommunication Union-Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2

Video and H.264/MPEG-4 Advanced Video Coding (AVC) and H.265/High Efficiency Video Coding (HEVC) standards.

Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the VVC standard targeting at fifty percent (50%) bitrate reduction compared to HEVC. VVC version 1 was finalized in July 2020.

Color space and chroma subsampling are discussed. Color space, also known as the color model (or color system), is an abstract mathematical model which simply describes the range of colors as tuples of numbers, typically as 3 or 4 values or color components (e.g., red green blue (RGB)). Basically speaking, color space is an elaboration of the coordinate system and sub-space.

For video compression, the most frequently used color spaces are YCbCr and RGB. YCbCr, Y'CbCr, or Y Pb/Cb Pr/Cr, also written as $YC_BC_R$ or $Y'C_BC_R$, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

For 4:4:4 chroma subsampling, each of the three Y'CbCr components have the same sample rate, thus there is no chroma subsampling. This scheme is sometimes used in high-end film scanners and cinematic post production.

For 4:2:2 chroma subsampling, the two chroma components are sampled at half the sample rate of luma: the horizontal chroma resolution is halved. This reduces the bandwidth of an uncompressed video signal by one-third with little to no visual difference.

For 4:2:0 chroma subsampling, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of two both horizontally and vertically. There are three variants of 4:2:0 schemes, having different horizontal and vertical siting.

In MPEG-2, Cb and Cr are co-sited horizontally. Cb and Cr are sited between pixels in the vertical direction (sited interstitially). In Joint Photographic Experts Group (JPEG)/ JPEG File Interchange Format (JFIF), H.261, and MPEG-1, Cb and Cr are sited interstitially, halfway between alternate luma samples. In 4:2:0 DV, Cb and Cr are co-sited in the horizontal direction. In the vertical direction, they are co-sited on alternating lines.

Definitions of video units are provided. A picture is divided into one or more tile rows and one or more tile columns. A tile is a sequence of coding tree units (CTUs) that covers a rectangular region of a picture. A tile is divided into one or more bricks, each of which consists of a number of CTU rows within the tile. A tile that is not partitioned into multiple bricks is also referred to as a brick. However, a brick that is a true subset of a tile is not referred to as a tile. A slice either contains a number of tiles of a picture or a number of bricks of a tile.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

FIG. 1 is an example of raster-scan slice partitioning of a picture 100, where the picture is divided into twelve tiles 102 and three raster-scan slices 104. As shown, each of the tiles 102 and slices 104 contains a number of CTUs 106.

Figure 2:
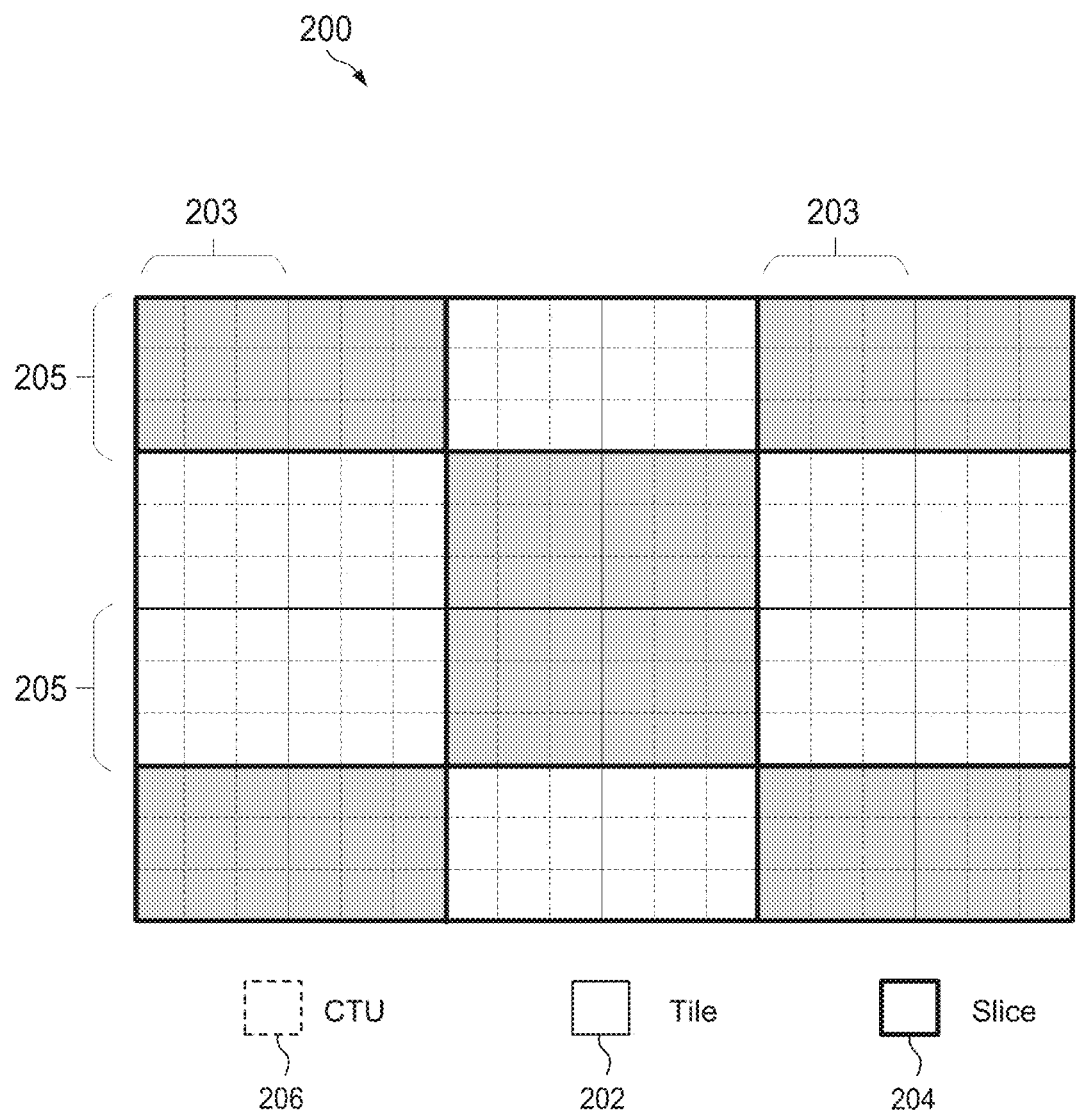
FIG. 2 is an example of rectangular slice partitioning of a picture.

FIG. 2 is an example of rectangular slice partitioning of a picture 200 according to the VVC specification, where the picture is divided into twenty-four tiles 202 (six tile columns 203 and four tile rows 205) and nine rectangular slices 204. As shown, each of the tiles 202 and slices 204 contains a number of CTUs 206.

Figure 3:
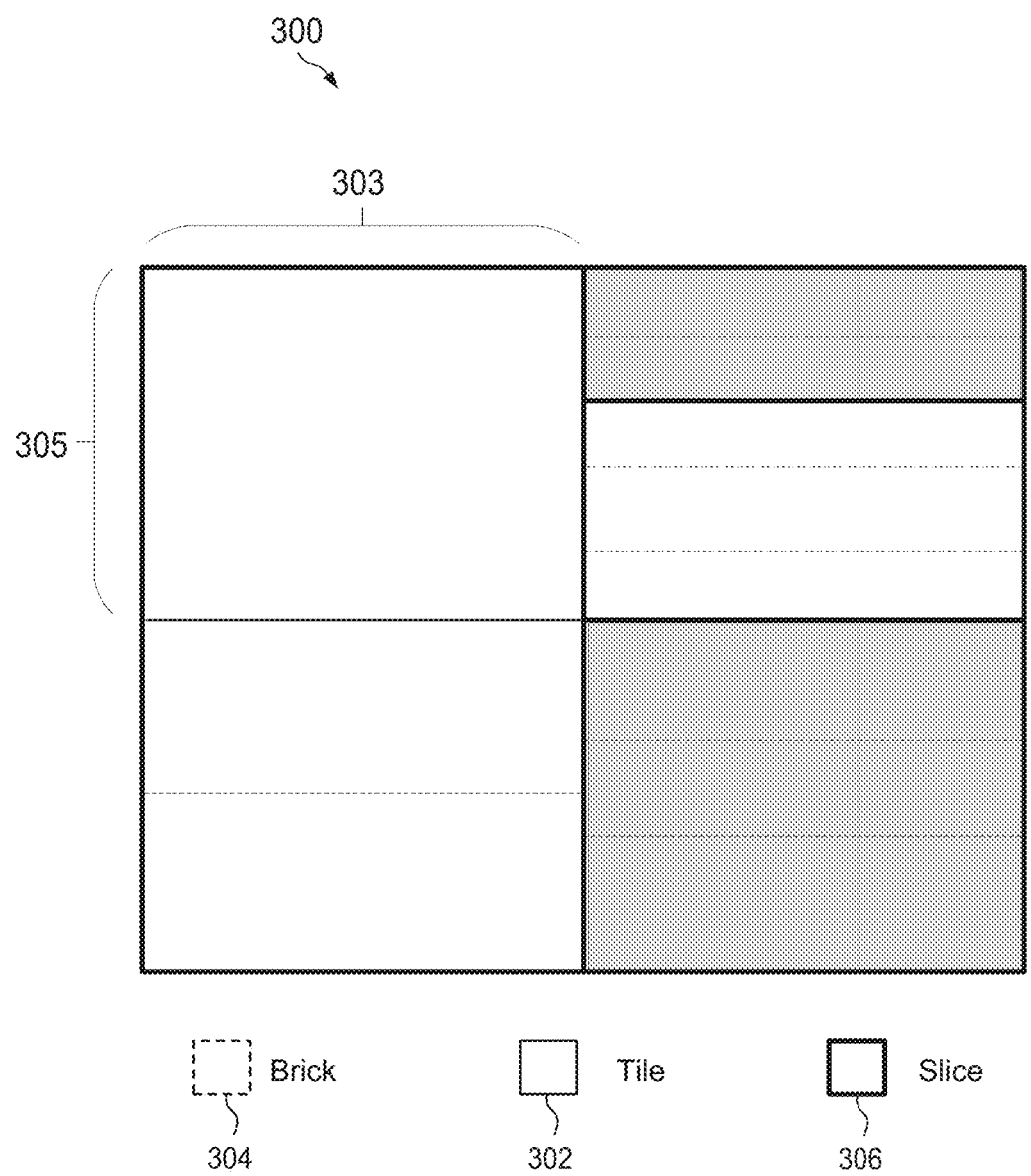
FIG. 3 is an example of a picture partitioned into tiles, bricks, and rectangular slices.

FIG. 3 is an example of a picture 300 partitioned into tiles, bricks, and rectangular slices according to the VVC specification, where the picture is divided into four tiles 302 (two tile columns 303 and two tile rows 305), eleven bricks 304 (the top-left tile contains one brick, the top-right tile contains five bricks, the bottom-left tile contains two bricks, and the bottom-right tile contain three bricks), and four rectangular slices 306.

CTU and coding tree block (CTB) sizes are discussed. In VVC, the coding tree unit (CTU) size, which is signaled in a sequence parameter set (SPS) by the syntax element log2_ctu_size_minus2, could be as small as 4×4. The sequence parameter set raw byte sequence payload (RBSP) syntax is below.

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) |  |
|   gra_enabled_flag | u(1) |
|   sps_seq_parameter_set_id | ue(v) |
|   chroma_format_idc | ue(v) |
|   if( chroma_format_idc = = 3 ) |  |
|     separate_colour_plane_flag | u(1) |
|   pic_width_in_luma_samples | ue(v) |
|   pic_height_in_luma_samples | ue(v) |
|   conformance_window_flag | u(1) |

|  | Descriptor |
|---|---|
| if( conformance_window_flag ) { | |
|   conf_win_left_offset | ue(v) |
|   conf_win_right_offset | ue(v) |
|   conf_win_top_offset | ue(v) |
|   conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for( i = ( sps_sub_layer_ordering_info_present_flag ? 0 : sps_max_sub_layers_minus1 );<br>    i <= sps_max_sub_layers_minus1; i++) { | |
|   sps_max_dec_pic_buffering_minus1[ i ] | ue(v) |
|   sps_max_num_reorder_pics[ i ] | ue(v) |
|   sps_max_latency_increase_plus1[ i ] | ue(v) |
| } | |
| long_term_ref_pics_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| qtbtt_dual_tree_intra_flag | u(1) |
| log2_ctu_size_minus2 | ue(v) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_max_mtt_hierarchy_depth_inter_slices != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag) { | |
|   sps_log2_diff_min_qt_min_cb_intra_slice_chroma | ue(v) |
|   sps_max_mtt_hierarchy_depth_intra_slice_chroma | ue(v) |
|   if ( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| ... | |
|   rbsp_trailing_bits( ) | |
| } | | log2_ctu_size_minus2 plus 2 specifies the luma coding tree block size of each CTU.

log2_min_luma_coding_block_size_minus2 plus 2 specifies the minimum luma coding block size.

The variables CtbLog2SizeY, CtbSizeY, MinCbLog2SizeY, MinCbSizeY, MinTbLog2SizeY, MaxTbLog2SizeY, MinTbSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows.

$$CtbLog2SizeY = \log2\_ctu\_size\_minus2 + 2 \qquad (7\text{-}9)$$

$$CtbSizeY = 1 \ll CtbLog2SizeY \qquad (7\text{-}10)$$

$$MinCbLog2SizeY = \log2\_min\_luma\_coding\_block\_size\_minus2 + 2 \qquad (7\text{-}11)$$

$$MinCbSizeY = 1 \ll MinCbLog2SizeY \qquad (7\text{-}12)$$

$$MinTbLog2SizeY = 2 \qquad (7\text{-}13)$$

$$MaxTbLog2SizeY = 6 \qquad (7\text{-}14)$$

$$MinTbSizeY = 1 \ll MinTbLog2SizeY \qquad (7\text{-}15)$$

$$MaxTbSizeY = 1 \ll MaxTbLog2SizeY \qquad (7\text{-}16)$$

$$PicWidthInCtbsY = Ceil(\text{pic\_width\_in\_luma\_samples} \div CtbSizeY) \qquad (7\text{-}17)$$

$$PicHeightInCtbsY = Ceil(\text{pic\_height\_in\_luma\_samples} \div CtbSizeY) \qquad (7\text{-}18)$$

$$PicSizeInCtbsY = PicWidthInCtbsY * PicHeightInCtbsY \qquad (7\text{-}19)$$

$$PicWidthInMinCbsY = \text{pic\_width\_in\_luma\_samples} / MinCbSizeY \qquad (7\text{-}20)$$

-continued $$PicHeightMinCbsY = pic\_height\_in\_luma\_samples / MinCbSizeY \quad (7-21)$$

$$PicSizeInMinCbsY = PicWidthMinCbsY * PicHeightInMinCbsY \quad (7-22)$$

$$PicSizeInSamplesY = \quad (7-23)$$
$$pic\_width\_in\_luma\_samples * pic\_height\_in\_luma\_samples$$

$$PicWidthInSamplesC = pic\_width\_in\_luma\_samples / SubWidthC \quad (7-24)$$

$$PicHeightSamplesC = pic\_height\_in\_luma\_samples / SubHeightC \quad (7-25)$$

Figure 4A:
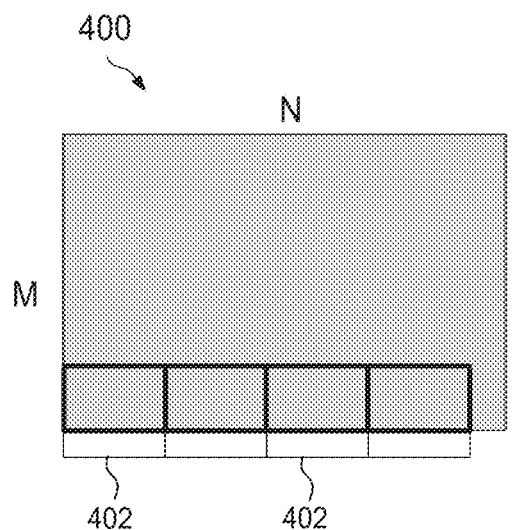
FIG. 4A is an example of coding tree blocks (CTBs) crossing the bottom picture border.
Figure 4B:
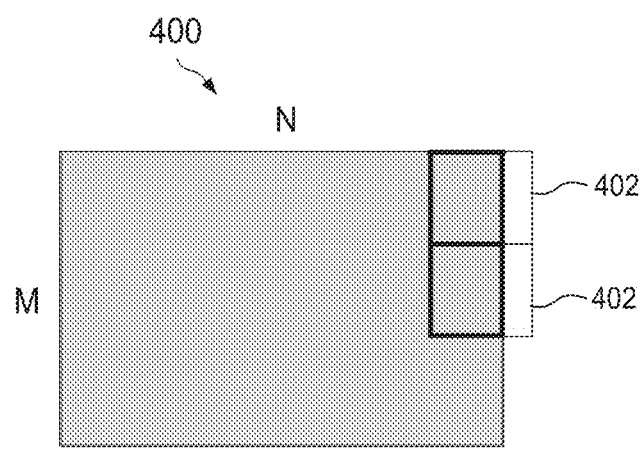
FIG. 4B is an example of CTBs crossing the right picture border.
Figure 4C:
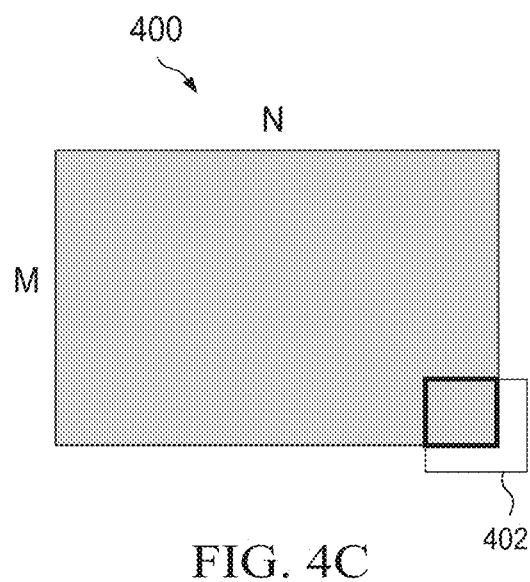
FIG. 4C is an example of CTBs crossing the right bottom picture border.

FIG. 4A is an example of CTBs crossing the bottom picture border. FIG. 4B is an example of CTBs crossing the right picture border. FIG. 4C is an example of CTBs crossing the right bottom picture border. In FIGS. 4A-4C, K=M, L<N; K<M, L=N; K<M, L<N, respectively.

CTUs in a picture 400 are discussed with reference to FIGS. 4A-4C. Suppose the CTB/largest coding unit (LCU) size indicated by M×N (typically M is equal to N, as defined in HEVC/VVC), and for a CTB located at picture (or tile or slice or other kinds of types, picture border is taken as an example) border, K×L samples are within picture border wherein either K<M or L<N. For those CTBs 402 as depicted in FIG. 4A-4C, the CTB size is still equal to M×N, however, the bottom boundary/right boundary of the CTB is outside the picture 400.

Figure 5:
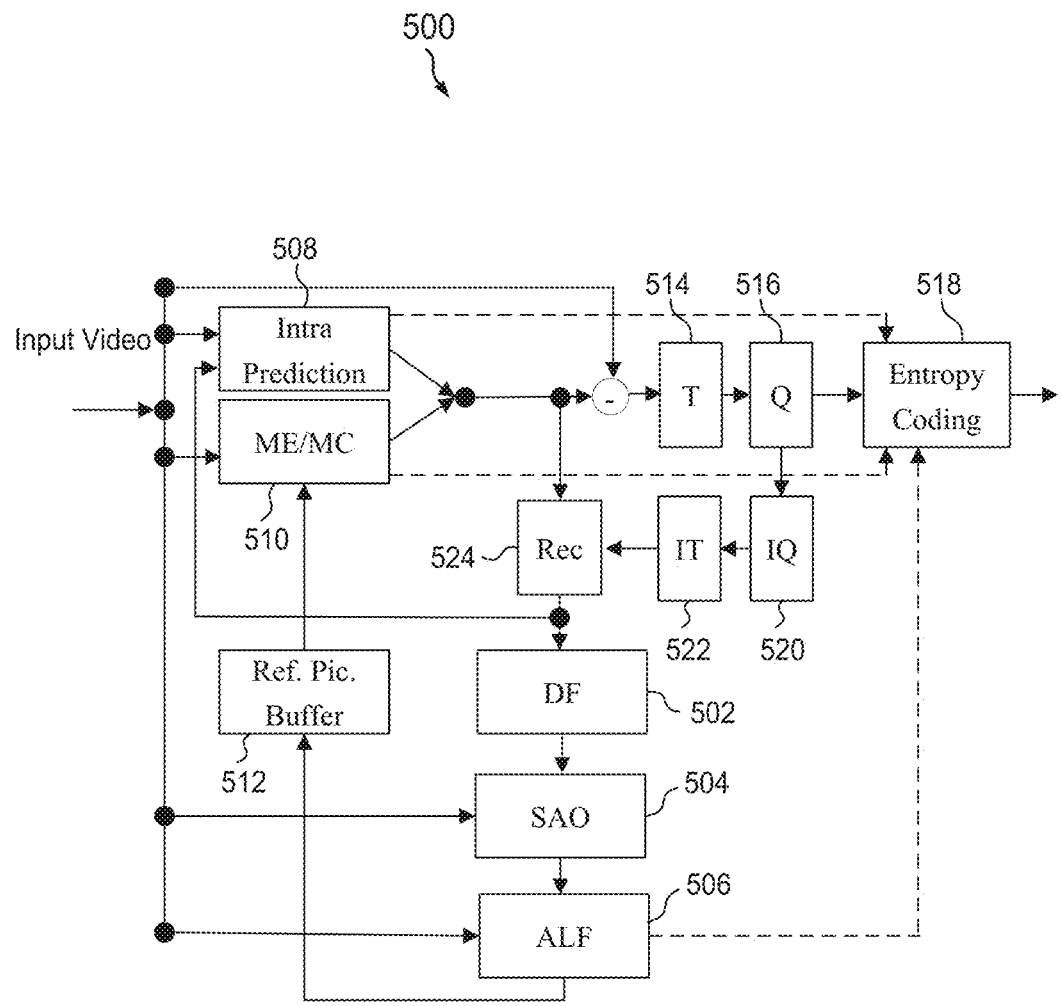
FIG. 5 is an example of encoder block diagram.

The coding flow of a typical video coder/decoder (a.k.a., codec) is discussed. FIG. 5 is an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

FIG. 5 is a schematic diagram of an encoder 500. The encoder 500 is suitable for implementing the techniques of VVC. The encoder 500 includes three in-loop filters, namely a deblocking filter (DF) 502, a sample adaptive offset (SAO) 504, and an ALF 506. Unlike the DF 502, which uses predefined filters, the SAO 504 and the ALF 506 utilize the original samples of the current picture to reduce the mean square errors between the original samples and the reconstructed samples by adding an offset and by applying a FIR filter, respectively, with coded side information signaling the offsets and filter coefficients. The ALF 506 is located at the last processing stage of each picture and can be regarded as a tool trying to catch and fix artifacts created by the previous stages.

The encoder 500 further includes an intra prediction component 508 and a motion estimation/compensation (ME/MC) component 510 configured to receive input video. The intra prediction component 508 is configured to perform intra prediction, while the ME/MC component 510 is configured to utilize reference pictures obtained from a reference picture buffer 512 to perform inter prediction. Residual blocks from inter prediction or intra prediction are fed into a transform component 514 and a quantization component 516 to generate quantized residual transform coefficients, which are fed into an entropy coding component 518. The entropy coding component 518 entropy codes the prediction results and the quantized transform coefficients and transmits the same toward a video decoder (not shown). Quantization components output from the quantization component 516 may be fed into an inverse quantization component 520, an inverse transform component 522, and a reconstruction (REC) component 524. The REC component 524 is able to output images to the DF 502, the SAO 504, and the ALF 506 for filtering prior to those images being stored in the reference picture buffer 512.

The input of the DF 502 is the reconstructed samples before in-loop filters. The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

Figure 6:
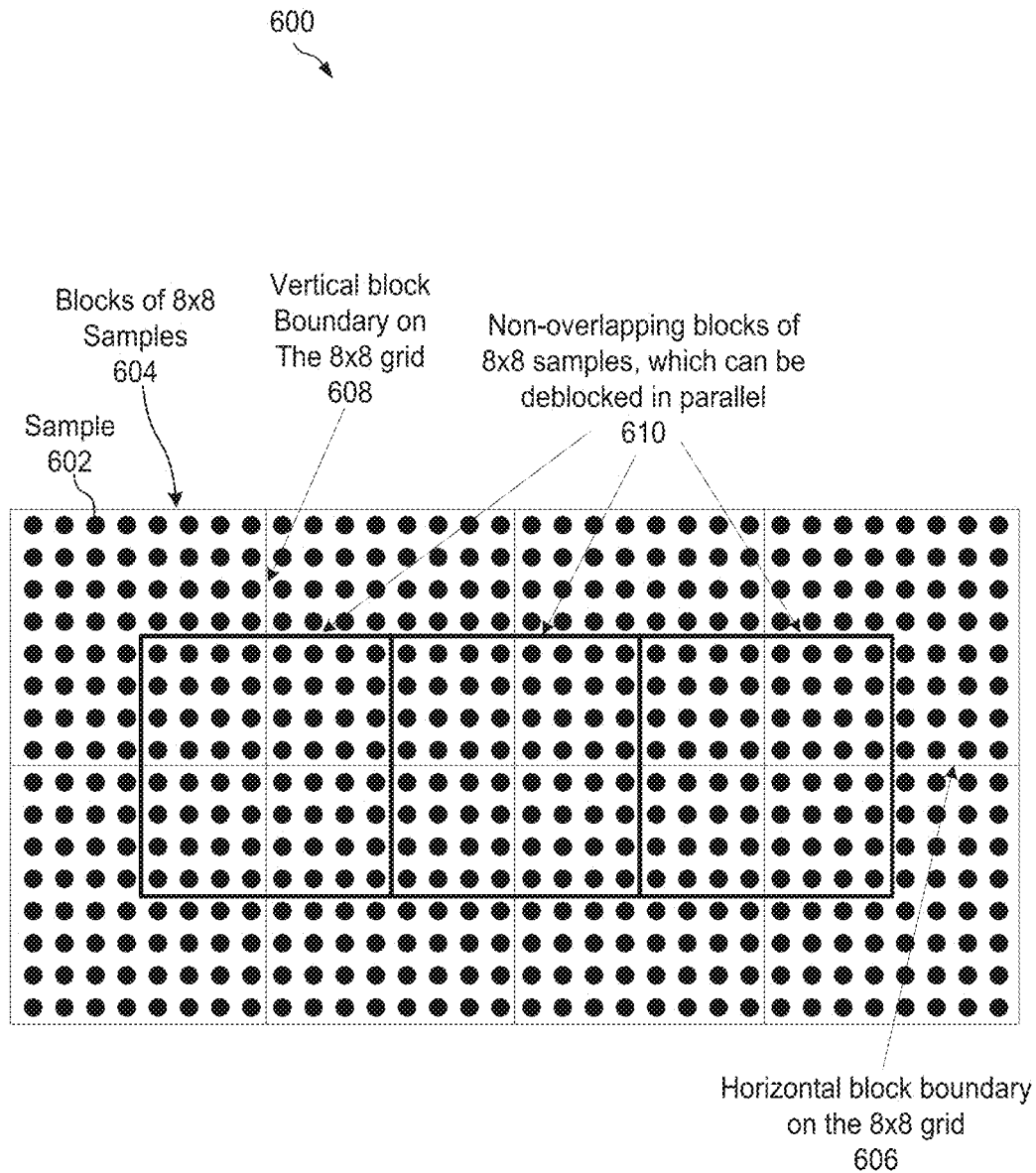
FIG. 6 is an illustration of samples within 8×8 blocks of samples.

FIG. 6 is an illustration 600 of samples 602 within 8×8 blocks of samples 604. As shown, the illustration 600 includes horizontal and vertical block boundaries on an 8×8 grid 606, 608, respectively. In addition, the illustration 600 depicts the nonoverlapping blocks of the 8×8 samples 610, which can be deblocked in parallel.

The boundary decision is discussed. Filtering is applied to 8×8 block boundaries. In addition, it must be a transform block boundary or a coding subblock boundary (e.g., due to usage of Affine motion prediction, Alternative temporal motion vector prediction (ATMVP)). For those which are not such boundaries, the filter is disabled.

The boundary strength calculation is discussed. For a transform block boundary/coding subblock boundary, if it is located in the 8×8 grid, the transform block boundary/coding subblock boundary may be filterd and the setting of bS[xD$_i$][yD$_j$] (wherein [xD$_i$][yD$_j$] denotes the coordinate) for this edge is defined in Table 1 and Table 2, respectively.

TABLE 1

| Boundary strength (when SPS IBC is disabled) | | | | |
|---|---|---|---|---|
| Priority | Conditions | Y | U | V |
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

| Boundary strength (when SPS IBC is enabled) | | | | |
|---|---|---|---|---|
| Priority | Conditions | Y | U | V |
| 8 | At least one of the adjacent blocks is intra | 2 | 2 | 2 |
| 7 | TU boundary and at least one of the adjacent blocks has non-zero transform coefficients | 1 | 1 | 1 |

TABLE 2-continued

Boundary strength (when SPS IBC is enabled)

| Priority | Conditions | Y | U | V |
|---|---|---|---|---|
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

The deblocking decision for a luma component is discussed.

FIG. 7 is an example 700 of pixels involved in filter on/off decision and strong/weak filter selection. A wider-stronger luma filter is used only if all of the Condition 1, Condition 2, and Condition 3 are TRUE. The Condition 1 is the "large block condition" This condition detects whether the samples at P-side and Q-side belong to large blocks, which are represented by the variable bSidePisLargeBlk and bSideQisLargeBlk, respectively. The bSidePisLargeBlk and bSideQisLargeBlk are defined as follows.

```
bSidePisLargeBlk = ((edge type is vertical and p0
belongs to CU with width >= 32) | | (edge type is
horizontal and p0 belongs to CU with height >= 32))?
TRUE: FALSE
bSideQisLargeBlk = ((edge type is vertical and q0
belongs to CU with width >= 32) | | (edge type is
horizontal and q0 belongs to CU with height >= 32))?
TRUE: FALSE
```

Based on bSidePisLargeBlk and bSideQisLargeBlk, the Condition 1 is defined as follows.

Condition 1=(bSidePisLargeBlk||bSidePisLargeBlk)? TRUE: FALSE

Next, if Condition 1 is true, the Condition 2 will be further checked. First, the following variables are derived.

```
dp0, dp3, dq0, dq3 are first derived as in HEVC
if (p side is greater than or equal to 32)
    dp0 = ( dp0 + Abs( p5₀ − 2 * p4₀ + p3₀ ) + 1 ) >> 1
    dp3 = ( dp3 + Abs( p5₃ − 2 * p4₃ + p3₃ ) + 1 ) >> 1
if (q side is greater than or equal to 32)
    dq0 = ( dq0 + Abs( q5₀ − 2 * q4₀ + q3₀ ) + 1 ) >> 1
    dq3 = ( dq3 + Abs( q5₃ − 2 * q4₃ + q3₃ ) + 1 ) >> 1
Condition 2 = (d < β) ? TRUE: FALSE
    where d= dp0 + dq0 + dp3 + dq3.
```

If Condition 1 and Condition 2 are valid, whether any of the blocks uses sub-blocks is further checked.

```
If (bSidePisLargeBlk)
{
    If (mode block P == SUBBLOCKMODE)
        Sp =5
    else
        Sp =7
}
else
    Sp = 3
If (bSideQisLargeBlk)
{
    If (mode block Q == SUBBLOCKMODE)
        Sq =5
    else
        Sq =7
}
else
    Sq = 3
```

Finally, if both the Condition 1 and Condition 2 are valid, the proposed deblocking method will check the condition 3 (the large block strong filter condition), which is defined as follows.

In the Condition3 StrongFilterCondition, the following variables are derived.

dpq is derived as in HEVC.

```
sp₃ = Abs( p₃ − p₀ ), derived as in HEVC
if (p side is greater than or equal to 32)
    if(Sp==5)
        sp₃ = ( sp₃ + Abs( p₅ − p₃ ) + 1 ) >> 1
    else
        sp₃ = ( sp₃ + Abs( p₇ − p₃ ) + 1 ) >> 1
sq₃ = Abs( q₀ − q₃ ), derived as in HEVC
if (q side is greater than or equal to 32)
    If(Sq==5)
        sq₃ = ( sq₃ + Abs( q₅ − q₃ ) + 1 ) >> 1
    else
        sq₃ = ( sq₃ + Abs( q₇ − q₃ ) + 1 ) >> 1
```

As in HEVC, StrongFilterCondition=(dpq is less than ($\beta$>>2), $sp_3$+$sq_3$ is less than (3*$\beta$>>5), and Abs($p_0$−$q_0$) is less than (5*$t_C$+1)>>1)? TRUE: FALSE.

A stronger deblocking filter for luma (designed for larger blocks) is discussed.

Bilinear filter is used when samples at either one side of a boundary belong to a large block. A sample belonging to a large block is defined as when the width >=32 for a vertical edge, and when height >=32 for a horizontal edge.

The bilinear filter is listed below.

Block boundary samples pi for i=0 to Sp−1 and $q_i$ for j=0 to Sq−1 (pi and qi are the i-th sample within a row for filtering vertical edge, or the i-th sample within a column for filtering horizontal edge) in HEVC deblocking described above) are then replaced by linear interpolation as follows.

$p'_i = (f_i * Middle_{s,t} + (64 - f_i) * P_s + 32) \gg 6)$, clipped to $p_i \pm tcPD_i$ $q'_j = (g_j * Middle_{s,t} + (64 - g_j) * Q_s + 32) \gg 6)$, clipped to $g_j \pm tcPD_j$ where $tcPD_i$ and $tcPD_j$ term is a position dependent clipping described in below and $g_j$, $f_i$, $Middle_{s,t}$, $P_s$ and $Q_s$ are given below.

A deblocking control for chroma is discussed.

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering and the conditions are checked sequentially. If a condition is satisfied, then the remaining conditions with lower priorities are skipped.

Chroma deblocking is performed when bS is equal to 2, or bS is equal to 1 when a large block boundary is detected.

The second and third condition is basically the same as HEVC luma strong filter decision as follows.

In the second condition: d is then derived as in HEVC luma deblocking. The second condition will be TRUE when d is less than β.

In the third condition StrongFilterCondition is derived as follows.

dpq is derived as in HEVC $$sp_3 = \text{Abs}(p_3 - p_0), \text{dervived as in } HEVC$$

$$sq_3 = \text{Abs}(q_0 - q_3), \text{dervived as in } HEVC$$

As in HEVC design, StrongFilterCondition=(dpq is less than (β>>2), $sp_3+sq_3$ is less than (β>>3), and $\text{Abs}(p_0-q_0)$ is less than $(5*t_C+1)>>1)$.

A strong deblocking filter for chroma is discussed. The following strong deblocking filter for chroma is defined.

$$p'_2 = (3*p_3 + 2*p_2 + p_1 + p_0 + q_0 + 4) \gg 3$$

$$p'_1 = (2*p_3 + p_2 + 2*p_1 + p_0 + q_0 + q_1 + 4) \gg 3$$

$$p'_0 = (p_3 + p_2 + p_1 + 2*p_0 + q_0 + q_1 + q_2 + 4) \gg 3$$

The proposed chroma filter performs deblocking on a 4×4 chroma sample grid.

Position dependent clipping (tcPD) is discussed. The position dependent clipping tcPD is applied to the output samples of the luma filtering process involving strong and long filters that are modifying 7, 5, and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process in the boundary strength calculation, position dependent threshold table is selected from two tables (i.e., Tc7 and Tc3 tabulated below) that are provided to decoder as a side information.

$$Tc7 = \{6, 5, 4, 3, 2, 1, 1\}; Tc3 = \{6, 4, 2\};$$

$$tcPD = (Sp == 3)?Tc3: Tc7;$$

$$tcQD = (Sq == 3)?Tc3: Tc7;$$

For the P or Q boundaries being filtered with a short symmetrical filter, position dependent threshold of lower magnitude is applied.

$$Tc3=\{3,2,1\};$$

Following defining the threshold, filtered $p'_i$ and $q'_i$ sample values are clipped according to tcP and tcQ clipping values.

$$p''_i = \text{Clip3}(p'_i + tcP_i, p'_i - tcP_i, p'_i);$$

$$q''_j = \text{Clip3}(q'_j + tcQ_j, q'_j - tcQ_j, q'_j)$$

where $p'_i$ and $q'_i$ are filtered sample values, $p''_i$ and $q''_j$ are output sample value after the clipping, and $tcP_i$ $tcP_i$ are clipping thresholds that are derived from the VVC tc parameter and tcPD and tcQD. The function Clip3 is a clipping function as it is specified in VVC.

Sub-block deblocking adjustment is now discussed. To enable parallel friendly deblocking using both long filters and sub-block deblocking the long filters is restricted to modify at most 5 samples on a side that uses sub-block deblocking (AFFINE or ATMVP or decoder side motion vector refinement (DMVR)) as shown in the luma control for long filters. Additionally, the sub-block deblocking is adjusted such that that sub-block boundaries on an 8×8 grid that are close to a coding unit (CU) or an implicit TU boundary is restricted to modify at most two samples on each side.

The following applies to sub-block boundaries that not are aligned with the CU boundary.

```
If (mode block Q == SUBBLOCKMODE && edge !=0) {
    if (!(implicitTU && (edge == (64 / 4))))
        if (edge == 2 || edge == (orthogonalLength - 2) || edge == (56 / 4) || edge == (72 / 4))
            Sp = Sq = 2;
        else
            Sp = Sq = 3;
    else
        Sp = Sq = bSideQisLargeBlk ? 5:3
}
```

Where edge equal to 0 corresponds to CU boundary, edge equal to 2 or equal to orthogonalLength-2 corresponds to sub-block boundary 8 samples from a CU boundary, etc. Where implicit TU is true if implicit split of TU is used.

Sample adaptive offset (SAO) is discussed. The input of SAO is the reconstructed samples after deblocking (DB). The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC and VVC, the region (the unit for SAO parameters signaling) is defined to be a CTU.

Two SAO types that can satisfy the requirements of low complexity are adopted in HEVC. Those two types are edge offset (EO) and band offset (BO), which are discussed in further detail below. An index of an SAO type is coded (which is in the range of [0, 2]). For EO, the sample classification is based on comparison between current samples and neighboring samples according to 1-D directional patterns: horizontal, vertical, 135° diagonal, and 45° diagonal.

Figure 8:
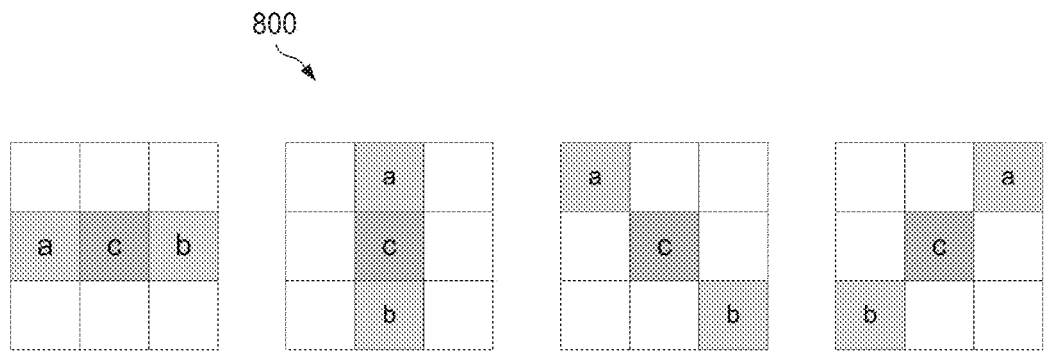
FIG. 8 shows four one dimensional (1-D) directional patterns for EO sample classification.

FIG. 8 shows four one dimensional (1-D) directional patterns 800 for EO sample classification: horizontal (EO class=0), vertical (EO class=1), 135° diagonal (EO class=2), and 45° diagonal (EO class=3).

For a given EO class, each sample inside the CTB is classified into one of five categories. The current sample value, labeled as "c," is compared with its two neighbors along the selected 1-D pattern. The classification rules for each sample are summarized in Table 3. Categories 1 and 4 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

TABLE 3

Sample Classification Rules for Edge Offset

| Category | Condition |
|---|---|
| 1 | c < a and c < b |
| 2 | (c < a&&c == b) \|\|(c == a&&c < b) |
| 3 | (c > a&&c == b) \|\|(c == a&&c > b) |
| 4 | c > a && c > b |
| 5 | None of above |

Geometry transformation-based adaptive loop filter in Joint Exploration Model (JEM) is discussed. The input of DB is the reconstructed samples after DB and SAO. The sample classification and filtering process are based on the reconstructed samples after DB and SAO.

In the JEM, a geometry transformation-based adaptive loop filter (GALF) with block-based filter adaption is applied. For the luma component, one among twenty-five filters is selected for each 2×2 block, based on the direction and activity of local gradients.

Figure 9:
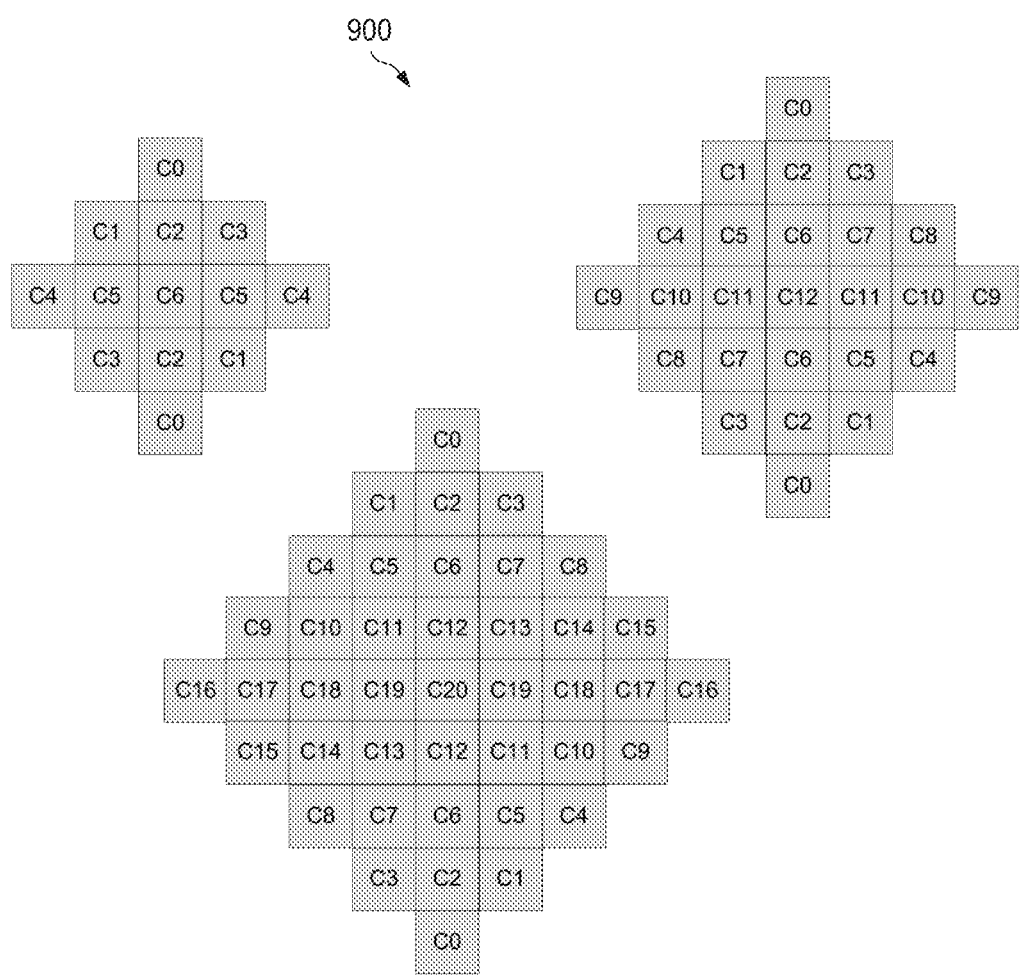
FIG. 9 shows examples of geometry transformation-based adaptive loop filter (GALF) filter shapes.

The filter shape is discussed. FIG. 9 shows examples of GALF filter shapes 900, including on the left a 5×5 diamond, in the middle a 7×7 diamond, and one the right a 9×9 diamond. In the JEM, up to three diamond filter shapes (as shown in FIG. 9) can be selected for the luma component. An index is signaled at the picture level to indicate the filter shape used for the luma component. Each square represents a sample, and Ci (i being 0-6 (left), 0-12 (middle), 0-20 (right)) denotes the coefficient to be applied to the sample. For chroma components in a picture, the 5×5 diamond shape is always used.

Block classification is discussed. Each 2×2 block is categorized into one out of twenty-five classes. The classification index C is derived based on its directionality D and a quantized value of activity $\hat{A}$, as follows.

$$C = 5D + \hat{A}. \quad (1)$$

To calculate D and A, gradients of the horizontal, vertical and two diagonal direction are first calculated using 1-D Laplacian.

$$g_v = \sum_{k=i-2}^{i+3} \sum_{l=j-2}^{j+3} V_{k,l}, \quad V_{k,l} = |2R(k, l) - R(k, l-1) - R(k, l+1)|, \quad (2)$$

$$g_h = \sum_{k=i-2}^{i+3} \sum_{l=j-2}^{j+3} H_{k,l}, \quad H_{k,l} = |2R(k, l) - R(k-1, l) - R(k+1, l)|, \quad (3)$$

$$g_{d1} = \sum_{k=i-2}^{i+3} \sum_{l=j-2}^{j+3} D1_{k,l}, \quad D1_{k,l} = |2R(k, l) - R(k-1, l-1) - R(k+1, l+1)|, \quad (4)$$

$$g_{d2} = \sum_{k=i-2}^{i+3} \sum_{l=j-2}^{j+3} D2_{k,l}, \quad D2_{k,l} = |2R(k, l) - R(k-1, l+1) - R(k+1, l-1)|, \quad (5)$$

Indices i and j refer to the coordinates of the upper left sample in the 2×2 block and R(i,j) indicates a reconstructed sample at coordinate (i,j).

Then D maximum and minimum values of the gradients of horizontal and vertical directions are set as:

$$g_{h,v}^{max} = \max(g_h, g_v), g_{h,v}^{min} = \min(g_h, g_v), \quad (6)$$

and the maximum and minimum values of the gradient of two diagonal directions are set as:

$$g_{d0,d1}^{max} = \max(g_{d0}, g_{d1}), g_{d0,d1}^{min} = \min(g_{d0}, g_{d1}), \quad (7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, is set to 4; otherwise D is set to 3.

The activity value A is calculated as:

$$A = \sum_{k=i-2}^{i+3} \sum_{l=j-2}^{j+3} (V_{k,l} + H_{k,l}). \quad (8)$$

A is further quantized to the range of 0 to 4, inclusively, and the quantized value is denoted as $\hat{A}$.

For both chroma components in a picture, no classification method is applied, i.e. a single set of ALF coefficients is applied for each chroma component.

Geometric transformation of filter coefficients is discussed.

Figure 10:
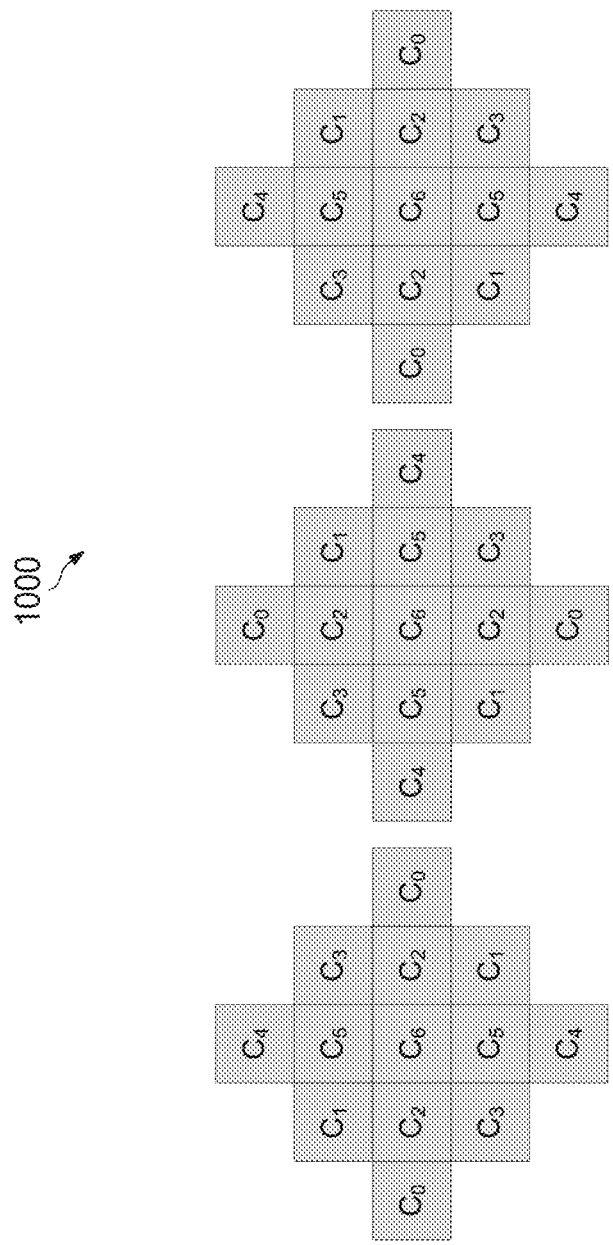
FIG. 10 shows an example of relative coordinates used for the 5×5 diamond filter support.

FIG. 10 shows relative coordinates 1000 for the 5×5 diamond filter support—diagonal, vertical flip, and rotation, respectively (from left to right).

Before filtering each 2×2 block, geometric transformations such as rotation or diagonal and vertical flipping are applied to the filter coefficients f(k,l), which is associated with the coordinate (k,l), depending on gradient values calculated for that block. This is equivalent to applying these transformations to the samples in the filter support region. The idea is to make different blocks to which ALF is applied more similar by aligning their directionality.

Three geometric transformations, including diagonal, vertical flip, and rotation are introduced:

Diagonal: $f_D(k, l) = f(l, k)$, (9)

Vertical flip: $f_V(k, l) = f(k, K - l - 1)$,

Rotation: $f_R(k, l) = f(K - l - 1, k)$.

where K is the size of the filter and 0≤k, l≤K−1 are coefficients coordinates, such that location (0,0) is at the upper left corner and location (K−1, K−1) is at the lower right corner. The transformations are applied to the filter coefficients f(k,l) depending on gradient values calculated for that block. The relationship between the transformation and the four gradients of the four directions are summarized in Table 4.

TABLE 1

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter parameters signaling is discussed. In the JEM, GALF filter parameters are signalled for the first CTU, i.e., after the slice header and before the SAO parameters of the first CTU. Up to 25 sets of luma filter coefficients could be signalled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures and bypass the GALF coefficients signalling. In this case, only an index to one of the reference pictures is signalled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture does not use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and the k-th array only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signalling overhead. For intra frames, temporal prediction is not available, and a set of 16 fixed filters is assigned to each class. To indicate the usage of the fixed filter, a flag for each class is signalled and if required, the index of the chosen fixed filter. Even when the fixed filter is selected for a given class, the coefficients of the adaptive filter f(k,l) can still be sent for this class in which case the coefficients of the filter which will be applied to the reconstructed image are sum of both sets of coefficients.

The filtering process of luma component can be controlled at the CU level. A flag is signalled to indicate whether GALF is applied to the luma component of a CU. For chroma component, whether GALF is applied or not is indicated at picture level only.

The filtering process is discussed. At the decoder side, when GALF is enabled for a block, each sample R(i,j) within the block is filtered, resulting in sample value R'(i,j) as shown below, where L denotes filter length, $f_{m,n}$ represents filter coefficient, and f(k,l) denotes the decoded filter coefficients.

$$R'(i, j) = \sum_{k=-L/2}^{L/2} \sum_{l=-L/2}^{L/2} f(k, l) \times R(i+k, j+l) \quad (1)$$

Figure 11:
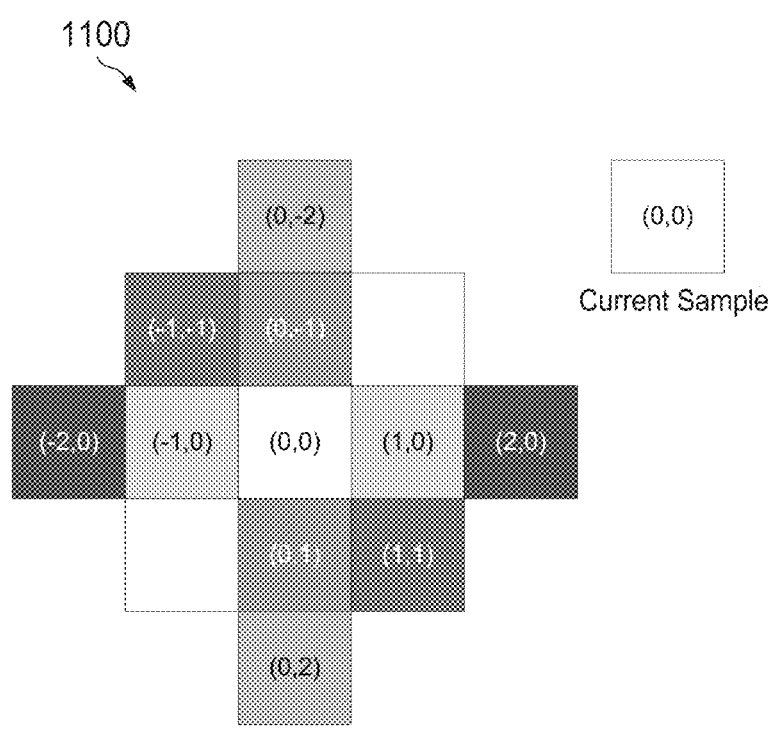
FIG. 11 shows another example of relative coordinates used for the 5×5 diamond filter support.

FIG. 11 shows an example of relative coordinates used for 5×5 diamond filter support supposing the current sample's coordinate (i,j) to be (0, 0). Samples in different coordinates filled with the same color are multiplied with the same filter coefficients.

Geometry transformation-based adaptive loop filter (GALF) in VVC is discussed. In VVC test model 4.0 (VTM4.0), the filtering process of the Adaptive Loop Filter, is performed as follows:

$$O(x,y)=\Sigma_{(i,j)}w(i,j)\cdot I(x+i,y+j), \quad (11)$$

where samples I(x+i, y+j) are input samples, O(x,y) is the filtered output sample (i.e., filter result), and w(i,j) denotes the filter coefficients. In practice, in VTM4.0 it is implemented using integer arithmetic for fixed point precision computations $$O(x, y) = \left(\sum_{i=-\frac{L}{2}}^{\frac{L}{2}} \sum_{j=-\frac{L}{2}}^{\frac{L}{2}} w(i, j).I(x+i, y+j) + 64\right) \gg 7, \quad (12)$$

where L denotes the filter length, and where w(i,j) are the filter coefficients in fixed point precision.

The current design of GALF in VVC has the following major changes compared to that in JEM:
1) The adaptive filter shape is removed. Only 7×7 filter shape is allowed for luma component and 5×5 filter shape is allowed for chroma component.
2) Signaling of ALF parameters in removed from slice/picture level to CTU level.
3) Calculation of class index is performed in 4×4 level instead of 2×2. In addition, as proposed in JVET-L0147, sub-sampled Laplacian calculation method for ALF classification is utilized. More specifically, there is no need to calculate the horizontal/vertical/45 diagonal/135 degree gradients for each sample within one block. Instead, 1:2 subsampling is utilized.

Non-linear ALF in the current VVC is discussed with regard to filtering reformulation.

Equation (11) can be reformulated, without coding efficiency impact, in the following expression:

$$O(x,y)=I(x,y)+\Sigma_{(i,j)\neq(0,0)}w(i,j)=(I(x+i,y+j)-I(x,y)), \quad (2)$$

where w(i,j) are the same filter coefficients as in equation (11) [excepted w(0, 0) which is equal to 1 in equation (13) while it is equal to $1-\Sigma_{(i,j)\neq(0,0)}w(i,j)$ in equation (11)].

Using the above filter formula of (13), VVC introduces the non-linearity to make ALF more efficient by using a simple clipping function to reduce the impact of neighbor sample values (I(x+i, y+j)) when they are too different with the current sample value (I(x,y)) being filtered.

More specifically, the ALF filter is modified as follows:

$$O'(x,y)=I(x,y)+\Sigma_{(i,j)\neq(0,0)}w(i,j)\cdot K(I(x+i,y+j)-I(x,y),k(i,j)), \quad (14)$$

where $K(d,b)=\min(b, \max(-b, d))$ is the clipping function, and $k(i,j)$ are clipping parameters, which depends on the $(i,j)$ filter coefficient. The encoder performs the optimization to find the best $k(i,j)$.

In the JVET-N0242 implementation, the clipping parameters $k(i,j)$ are specified for each ALF filter, one clipping value is signaled per filter coefficient. It means that up to 12 clipping values can be signalled in the bitstream per Luma filter and up to 6 clipping values for the Chroma filter.

In order to limit the signaling cost and the encoder complexity, only 4 fixed values which are the same for INTER and INTRA slices are used.

Because the variance of the local differences is often higher for Luma than for Chroma, two different sets for the Luma and Chroma filters are applied. The maximum sample value (here 1024 for 10 bits bit-depth) in each set is also introduced, so that clipping can be disabled if it is not necessary.

The sets of clipping values used in the JVET-N0242 tests are provided in the Table 5. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L = \left\{\text{round}\left(\left((M)^{\frac{1}{N}}\right)^{N-n+1}\right) \text{ for } n \in 1...N\right\}, \quad (15)$$

with $M = 2^{10}$ and $N = 4$.

Similarly, the Chroma tables of clipping values is obtained according to the following formula:

$$AlfClip_C = \left\{\text{round}\left(\left(\left(\frac{M}{A}\right)^{\frac{1}{N-1}}\right)^{N-n}\right) \text{ for } n \in 1...N\right\}, \quad (16)$$

with $M = 2^{10}$ and $N = 4$ and $A = 4$.

TABLE 5

Authorized clipping values

| | INTRA/INTER tile group |
|---|---|
| LUMA | { 1024, 181, 32, 6 } |
| CHROMA | { 1024, 161, 25, 4 } |

The selected clipping values are coded in the "alf_data" syntax element by using a Golomb encoding scheme corresponding to the index of the clipping value in the above Table 5. This encoding scheme is the same as the encoding scheme for the filter index.

Convolutional Neural network-based loop filters for video coding are discussed.

In deep learning, a convolutional neural network (CNN, or ConvNet) is a class of deep neural networks, most commonly applied to analyzing visual imagery. They have very successful applications in image and video recognition/processing, recommender systems, image classification, medical image analysis, natural language processing.

CNNs are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme.

CNNs use relatively little pre-processing compared to other image classification/processing algorithms. This means that the network learns the filters that in traditional algorithms were hand-engineered. This independence from prior knowledge and human effort in feature design is a major advantage.

Deep learning-based image/video compression typically has two implications: end-to-end compression purely based on neural networks, and traditional frameworks enhanced by neural networks. End-to-end compression purely based on neural networks are discussed in Johannes Bane, Valero Laparra, and Eero P. Simoncelli, "End-to-end optimization of nonlinear transform codes for perceptual quality," In: 2016 Picture Coding Symposium (PCS), pp. 1-5, Institute of Electrical and Electronics Engineers (IEEE) and Lucas Theis, Wenzhe Shi, Andrew Cunningham, and Ferenc Huszár, "Lossy image compression with compressive autoencoders," arXiv preprint arXiv:1703.00395 (2017). Traditional frameworks enhanced by neural networks are discussed in Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), 3236-3247, Yuanying Dai, Dong Liu, and Feng Wu, "A convolutional neural network approach for post-processing in HEVC intra coding," MMM. Springer, 28-39, Rui Song, Dong Liu, Houqiang Li, and Feng Wu, "Neural network-based arithmetic coding of intra prediction modes in HEVC," VCIP. IEEE, 1-4, and J. Pfaff, P. Helle, D. Maniry, S. Kaltenstadler, W. Samek, H. Schwarz, D. Marpe, and T. Wiegand, "Neural network based intra prediction for video coding," Applications of Digital Image Processing XLI, Vol. 10752. International Society for Optics and Photonics, 1075213.

The first type usually takes an auto-encoder like structure, either achieved by convolutional neural networks or recurrent neural networks. While purely relying on neural networks for image/video compression can avoid any manual optimizations or hand-crafted designs, compression efficiency may be not satisfactory. Therefore, works distributed in the second type take neural networks as an auxiliary, and enhance traditional compression frameworks by replacing or enhancing some modules. In this way, they can inherit the merits of the highly optimized traditional frameworks. For example, a fully connected network for the intra prediction is proposed in HEVC as discussed in Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), p. 3236-3247.

In addition to intra prediction, deep learning is also exploited to enhance other modules. For example, the in-loop filters of HEVC are replaced with a convolutional neural network and achieve promising results in Yuanying Dai, Dong Liu, and Feng Wu, "A convolutional neural network approach for post-processing in HEVC intra coding," MMM. Springer, 28-39. The work in Rui Song, Dong Liu, Houqiang Li, and Feng Wu, "Neural network-based arithmetic coding of intra prediction modes in HEVC," VCIP. IEEE, 1-4 applies neural networks to improve the arithmetic coding engine.

Convolutional neural network based in-loop filtering is discussed. In lossy image/video compression, the reconstructed frame is an approximation of the original frame, since the quantization process is not invertible and thus incurs distortion to the reconstructed frame. To alleviate such distortion, a convolutional neural network could be trained to learn the mapping from the distorted frame to the original frame. In practice, training must be performed prior to deploying the CNN-based in-loop filtering.

Training is discussed. The purpose of the training processing is to find the optimal value of parameters including weights and bias.

First, a codec (e.g. HM, JEM, VTM, etc.) is used to compress the training dataset to generate the distorted reconstruction frames. Then, the reconstructed frames are fed into the CNN and the cost is calculated using the output of CNN and the groundtruth frames (original frames). Commonly used cost functions include Sum of Absolution Difference (SAD) and Mean Square Error (MSE). Next, the gradient of the cost with respect to each parameter is derived through the back propagation algorithm. With the gradients, the values of the parameters can be updated. The above process repeats until the convergence criteria is met. After completing the training, the derived optimal parameters are saved for use in the inference stage.

The convolutional process is discussed. During convolution, the filter is moved across the image from left to right, top to bottom, with a one-pixel column change on the horizontal movements, then a one-pixel row change on the vertical movements. The amount of movement between applications of the filter to the input image is referred to as the stride, and it is almost always symmetrical in height and width dimensions. The default stride or strides in two dimensions is (1,1) for the height and the width movement.

Figure 12A:
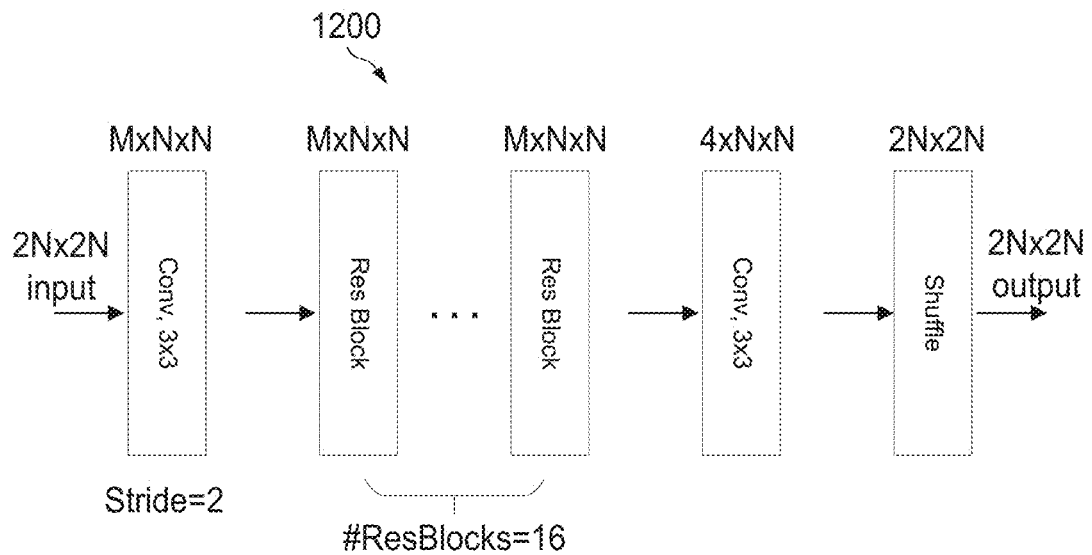
FIG. 12A is an example architecture of the proposed CNN filter.
Figure 12B:
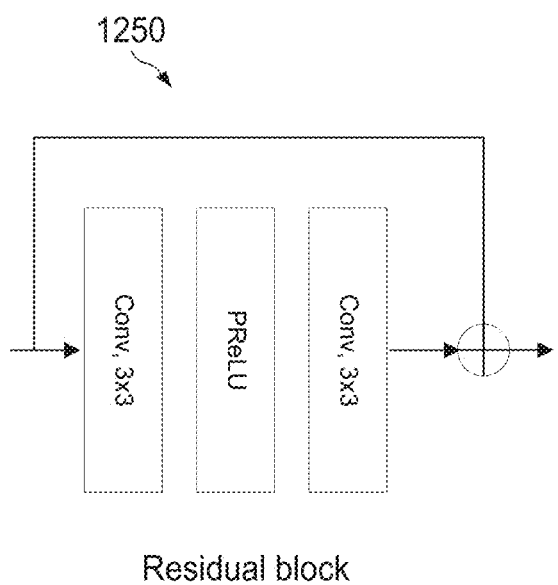
FIG. 12B is an example of construction of residual block (ResBlock).

FIG. 12A is an example architecture 1200 of the proposed CNN filter, and FIG. 12B is an example of construction 1250 of residual block (ResBlock). In most of deep convolutional neural networks, residual blocks are utilized as the basic module and stacked several times to construct the final network wherein in one example, the residual block is obtained by combining a convolutional layer, a ReLU/PReLU activation function and a convolutional layer as shown in FIG. 12B.

Inference is discussed. During the inference stage, the distorted reconstruction frames are fed into CNN and processed by the CNN model whose parameters are already determined in the training stage. The input samples to the CNN can be reconstructed samples before or after DB, or reconstructed samples before or after SAO, or reconstructed samples before or after ALF.

The current CNN-based loop filtering has the following problems. First, an individual CNN model is trained for each quality level (e.g., a quantization parameter (QP), a constant rate factor (CRF), or a bitrate), which results in a large number of CNN models. Second, when QP is taken as the input of neural networks, it is first tiled into a two-dimensional array with the same size as the block to be filtered, and then treated as an additional input plane. Accordingly, the QP information may not be fully exploited. Third, when constructing a candidate list containing multiple models for a coding block, the characteristics of the coding block have not been fully explored.

Disclosed herein are techniques that solve one or more of the foregoing problems. For example, the present disclosure provides one or more neural network (NN) filter models trained as part of an in-loop filtering technology or filtering technology used in a post-processing stage for reducing the distortion incurred during compression. In addition, samples with different characteristics are processed by different NN filter models. The present disclosure also elaborates how to design a unified NN filter model by feeding at least one indicator, which may be related to quality level (e.g., QP, CRF, or bitrate) and thus is a quality-level indicator (QI), as an input to the NN filter, and how to construct the candidate list containing multiple models for a coding block by taking the coding statistics of the block into account. It should be noted that the concept of a unified NN filter model by feeding the QI as an input to the NN filter process could be also extended to other NN-based coding tools, such as NN-based super-resolution or motion compensation design. In the examples below, NN-based filtering technology is used as an example.

The listing of embodiments below should be considered as examples to explain general concepts. These embodiments should not be interpreted in a narrow way. Furthermore, these embodiments can be combined in any manner.

In the disclosure, a NN filter can be any kind of NN filter, such as a convolutional neural network (CNN) filter. In the following discussion, an NN filter may also be referred to as a CNN filter.

In the following discussion, a video unit may be a sequence, a picture, a slice, a tile, a brick, a subpicture, a CTU/CTB, a CTU/CTB row, one or multiple CUs/coding blocks (CBs), one or multiple CTUs/CTBs, one or multiple Virtual Pipeline Data Unit (VPDU), a sub-region within a picture/slice/tile/brick. A father video unit represents a unit larger than the video unit. Typically, a father unit will contain several video units, for example, when the video unit is CTU, the father unit could be slice, CTU row, multiple CTUs, etc. In some embodiments, the video unit may be a sample/pixel.

Figure 13:
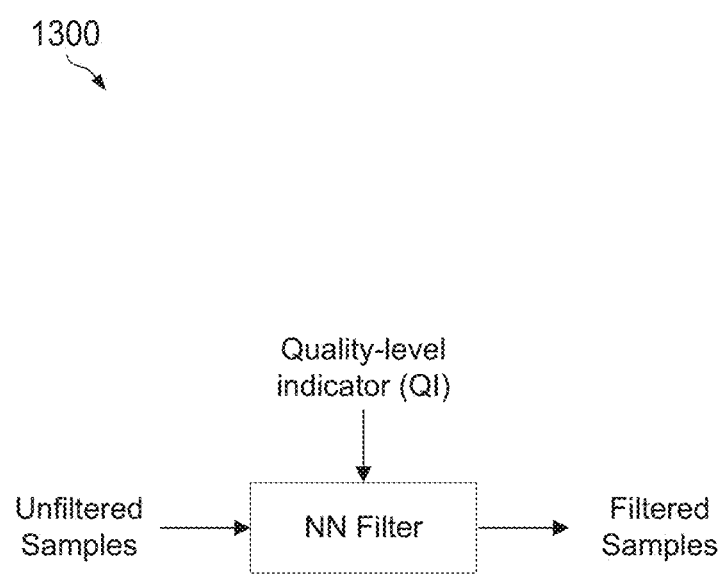
FIG. 13 is an example of a process for generating filtered samples based on a neural network filter model that receives a quality-level indicator as an input in accordance with various examples.

FIG. 13 is an example of a process for generating filtered samples based on a NN filter model that receives a quality-level indicator (QI) as an input. In the process 1300 shown in FIG. 13, at least some unfiltered samples are provided as input into an NN filter. In an example, an unfiltered sample is a sample (e.g., a pixel) of a video unit that has not been subjected to any filtering yet, or has not been subjected to a sufficient amount of filtering yet. The output of the NN filter may thus be a filtered sample. The output of the NN filter is also based on an NN filter model generated using a quality-level indicator (QI) input. The QI input may be related to a quality level of the video unit, such as a QP, CRF, or bitrate.

Figure 14:
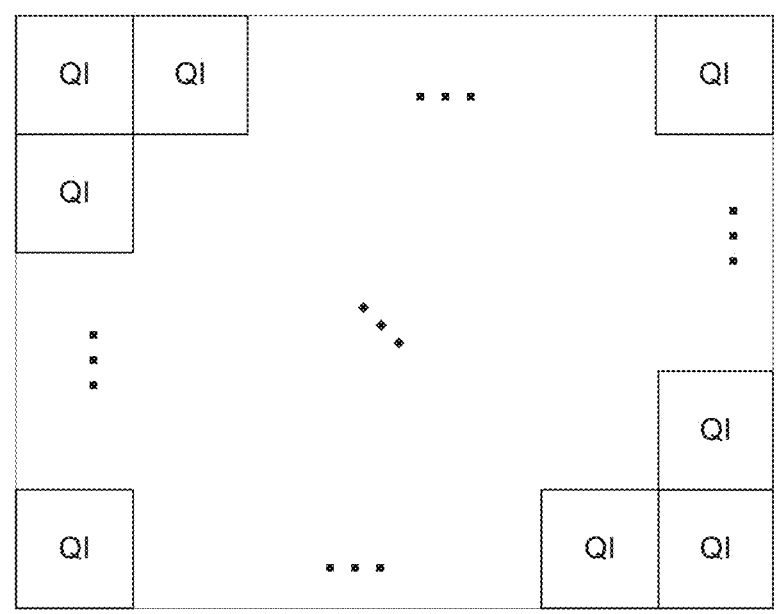
FIG. 14 is an example of a quality-level indicator being spanned or tiled into a two-dimensional array in accordance with various examples.

FIG. 14 is an example of a process 1400 of a quality-level indicator being spanned or tiled into a two-dimensional array in accordance with some examples. For example, in the process 1400, the two-dimensional array may have a same size (e.g., in each of two dimensions) as the video unit to be filtered, and is an additional input plane to the NN filter.

Figure 15:
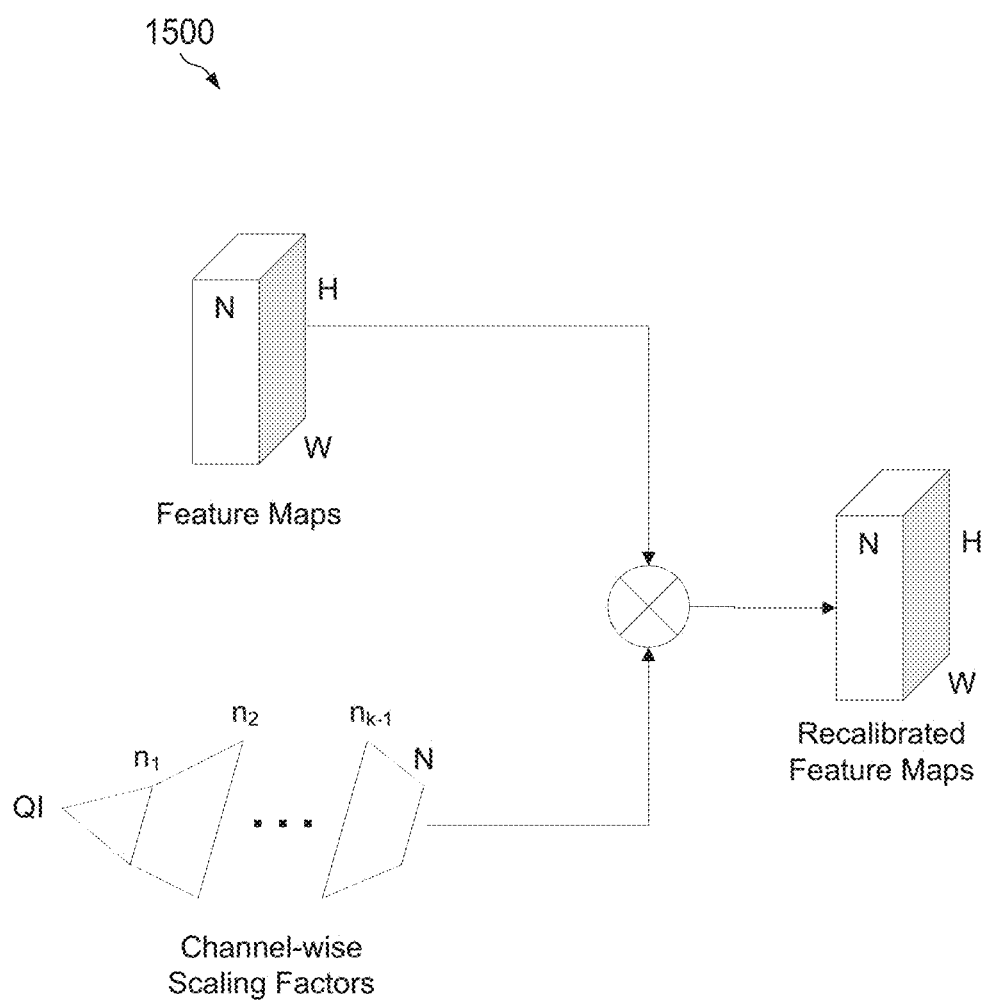
FIG. 15 is an example of a quality-level indicator being fed into a plurality of full-connected layers (e.g., of a NN filter) to be expanded into a one-dimensional vector in accordance with various examples.

FIG. 15 is an example of a process 1500 of a quality-level indicator (QI) being fed into a plurality of full-connected layers (e.g., of a NN filter) to be expanded into a one-dimensional vector. In the process 1500, elements of the resulting one-dimensional vector may serve as channel-wise scaling factors. In the process 1500, the channel-wise scaling factors are useful to recalibrate feature maps of NN filter models (e.g., where N represents channel numbers, W represents width, and H represents height), and thus provide recalibrated feature maps in some examples.

A discussion of the model selection is provided.

Example 1

1. A NN filter model may take at least one indicator which may be related to the quality level as input. The indicator is noted as quality-level indicator (QI).

a. In one example, the quality-level indicator of a video unit is the quantization parameter (QP) associated with the video unit.

b. In one example, the quality-level indicator of a video unit is the QP associated with the sequence (e.g., the initial QP signalled in SPS) that the video unit belongs to.

c. In one example, the quality-level indicator of a video unit is the QP associated with the picture or slice that the video unit belongs to.

d. Alternatively, the QP could be replaced by a quantization step corresponding to the QPs described in above bullets a, b, and c. For example, the QI input may be an output of a quantization process applied to a video unit, where the quantization process is based on a QP of the video unit, a QP of a sequence that includes the video unit, or a QP of a picture or slice that includes the video unit.

e. In one example, the quality-level indicator is first tiled or spanned into a two-dimensional arrays with the same size as the video unit to be filtered and then treated as an additional input plane, such as the tiling process shown in FIG. 14 for example.

i. In one example, the video unit is a CTU/CTB.

f. In one example, the quality-level indicator is fed into several fully-connected layers of the NN filter to be expanded into a one-dimensional vector, whose elements will serve as the channel-wise scaling factors to recalibrate the feature maps of NN filter models.

i. In one example, the feature maps of NN filter models are denoted as $f \in R^{N \times W \times H}$, where N, W, and H are the channel numbers, width, and height respectively. Let $S \in R^N$ represent the one-dimensional vector obtained by the fully connected layers. Then, the above recalibration process could be written as: $F^{i,j,k} = f^{i,j,k} \times S^i$, $1 \le i \le N$, $1 \le j \le W$, $1 \le k \le H$, where F is the recalibrated feature maps, such as shown in FIG. 15 for example.

g. In one example, the quality-level indicator is used as an additional input plane as well as the recalibration factors, i.e., aspects e and f could be combined.

h. In one example, the quality-level indicator may be signaled from the encoder to decoder, such as in SPS, picture parameter set (PPS), picture header, slice header, CTU, CU, or at any region level. In some examples, the PPS may include information on entropy coding mode, slice groups. motion prediction, and deblocking filters.

i. In one example, f(QI) instead of QI may be fed into the NN, wherein f is any function.

j. In one example, the usage of QI may depend on color components.

i. For example, a first QI may be used for a first component (such as luma) and a second QI may be used for a second component (such as chroma like Cb or Cr). The first QI may indicate the quality level of the first component and the second QI may indicate the quality level of the second component.

ii. For example, a first QI may be used for a first component (such as luma) and the first QI may also be used for a second component (such as chroma like Cb or Cr). The first QI may indicate the quality level of the first component.

iii. For example, QI may be used for NN filtering for a first component (such as luma) but not for a second component (such as chroma like Cb or Cr).

iv. For example, QI may be used for NN filtering for all components.

k. In one example, the QI used to filter a first video unit may indicate the quality of a region or picture comprising the first video unit l. In one example, the QI used to filter a first video unit may indicate the quality of region or picture not comprising the first video unit.

i. For example, the QI may indicate the quality of region or picture which is referred to by the first video unit.

Example 2

2. In a second embodiment, constructing the filtering candidate list could be dependent on the coding statistics of the video unit (e.g. prediction modes, qp, slice type, etc.).

a. In one example, the candidate list could be dependent on the ratio of a first group of samples coded by coding tool (or coding mode) X in the video unit.

i. In one example, X is one prediction mode, such as intra coded mode.

1) Alternatively, X may be any other coding tools such as any inter-prediction tool or transform/quantization coding tool.

ii. In one example, X is multiple prediction modes, such as including intra/palette/IBC coded mode.

iii. In one example, one candidate in the candidate list is the NN filter model corresponding to the candidate for coding intra slices if the ratio of intra-coded samples is no smaller than or greater than a threshold iv. In one example, the first candidate is the NN filter model corresponding to the intra-slice if the ratio of intra-coded samples is no smaller than or greater than a threshold.

v. In the above examples, the threshold may be pre-defined.

1) In one example, the video unit is a CTU/CTB.

2) In one example, the threshold is set to 0.5.

3) Alternatively, the threshold may be derived on-the-fly, such as according to decoded information, e.g., sequence or picture or slice level QP.

4) Alternatively, the threshold may be derived on-the-fly, such as according to color component.

b. In one example, the above methods of Example 2 may be applied conditionally.

i. In one example, the above method(s) may be applied to luma component only.

ii. In one example, the above method(s) may be applied to multiple color components.

1) In one example, coding statistics of the luma block may be used to determine the candidate list for luma; and coding statistics of the chroma block may be used to determine the candidate list for chroma.

2) In another example, coding statistics of the luma block may be used to determine the candidate list for both luma and chroma.

iii. In one example, the above method(s) may be applied to certain temporal layers.

1) In one example, they may be applied to temporal layers with ID greater than K (e.g., K=3).

2) In one example, they may be applied to temporal layers with ID smaller than K (e.g., K=4).

iv. In one example, the above method(s) may be applied to certain picture/slice types, such as P or B slices.

c. The first group of samples may be in the same picture containing the video unit to be filtered by NN.

i. Alternatively, the first group of samples may be in a different picture as the video unit to be filtered by NN. For example, the first group of samples may be in a reference picture of the video unit.

ii. Alternatively, the first group of samples may be in multiple pictures coded/decoded prior to the picture comprising the video unit to be filtered.

Figure 16:
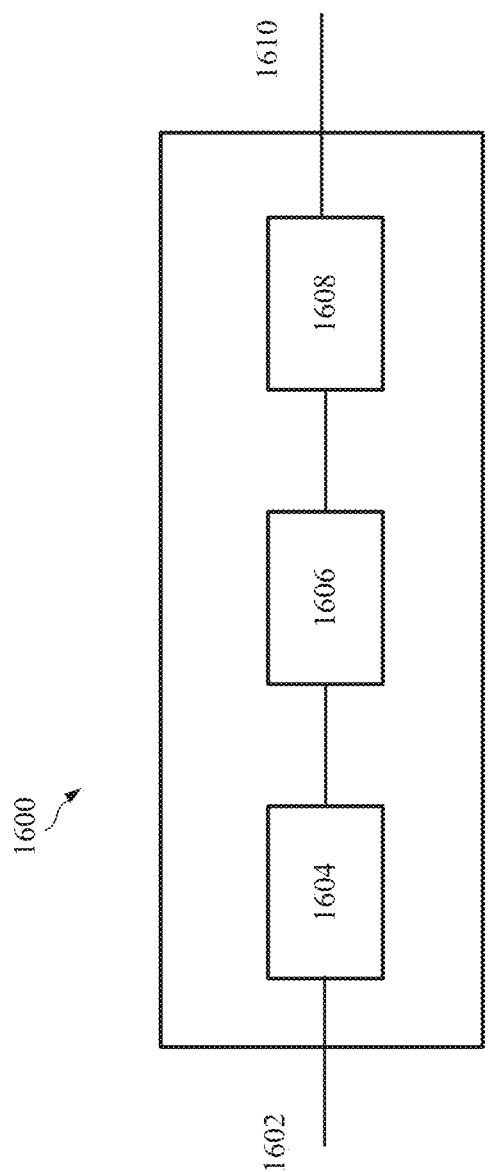
FIG. 16 is a block diagram showing an example video processing system.

FIG. 16 is a block diagram showing an example video processing system 1600 in which various techniques disclosed herein may be implemented. Various implementations may include some or all of the components of the video processing system 1600. The video processing system 1600 may include input 1602 for receiving video content. The video content may be received in a raw or uncompressed format, e.g., 8 or 10 bit multi-component pixel values, or may be in a compressed or encoded format. The input 1602 may represent a network interface, a peripheral bus interface, or a storage interface. Examples of network interface include wired interfaces such as Ethernet, passive optical network (PON), etc. and wireless interfaces such as Wi-Fi or cellular interfaces.

The video processing system 1600 may include a coding component 1604 that may implement the various coding or encoding methods described in the present document. The coding component 1604 may reduce the average bitrate of video from the input 1602 to the output of the coding component 1604 to produce a coded representation of the video. The coding techniques are therefore sometimes called video compression or video transcoding techniques. The output of the coding component 1604 may be either stored, or transmitted via a communication connected, as represented by the component 1606. The stored or communicated bitstream (or coded) representation of the video received at the input 1602 may be used by the component 1608 for generating pixel values or displayable video that is sent to a display interface 1610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), Peripheral Component Interconnect (PCI), Integrated Drive Electronics (IDE) interface, and the like. The techniques described in the present document may be embodied in various electronic devices such as mobile phones, laptops, smartphones or other devices that are capable of performing digital data processing and/or video display.

Figure 17:
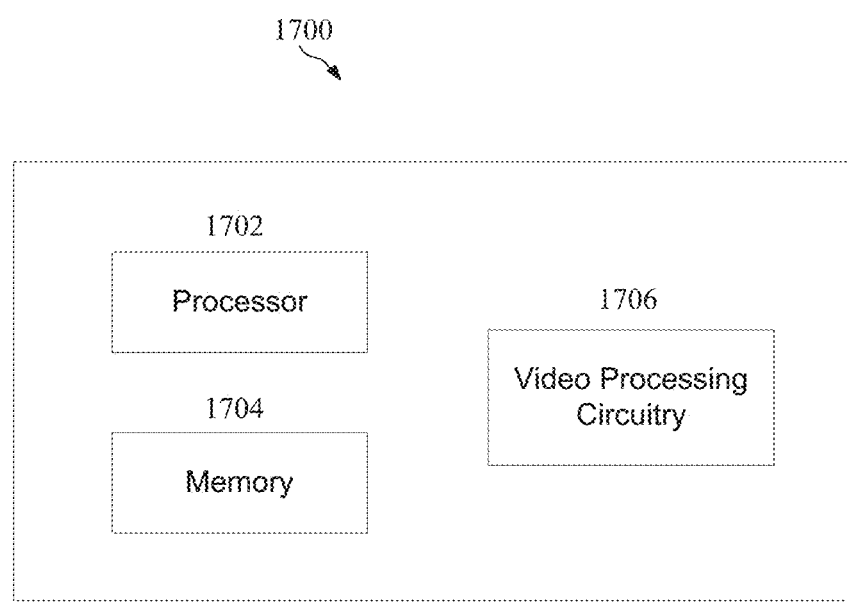
FIG. 17 is a block diagram of a video processing apparatus.

FIG. 17 is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706 (a.k.a., video processing circuitry). The processor(s) 1702 may be configured to implement one or more methods described in the present document. The memory (memories) 1704 may be used for storing data and code used for implementing the methods and techniques described herein. The video processing hardware 1706 may be used to implement, in hardware circuitry, some techniques described in the present document. In some embodiments, the hardware 1706 may be partly or completely located within the processor 1702, e.g., a graphics processor.

Figure 18:
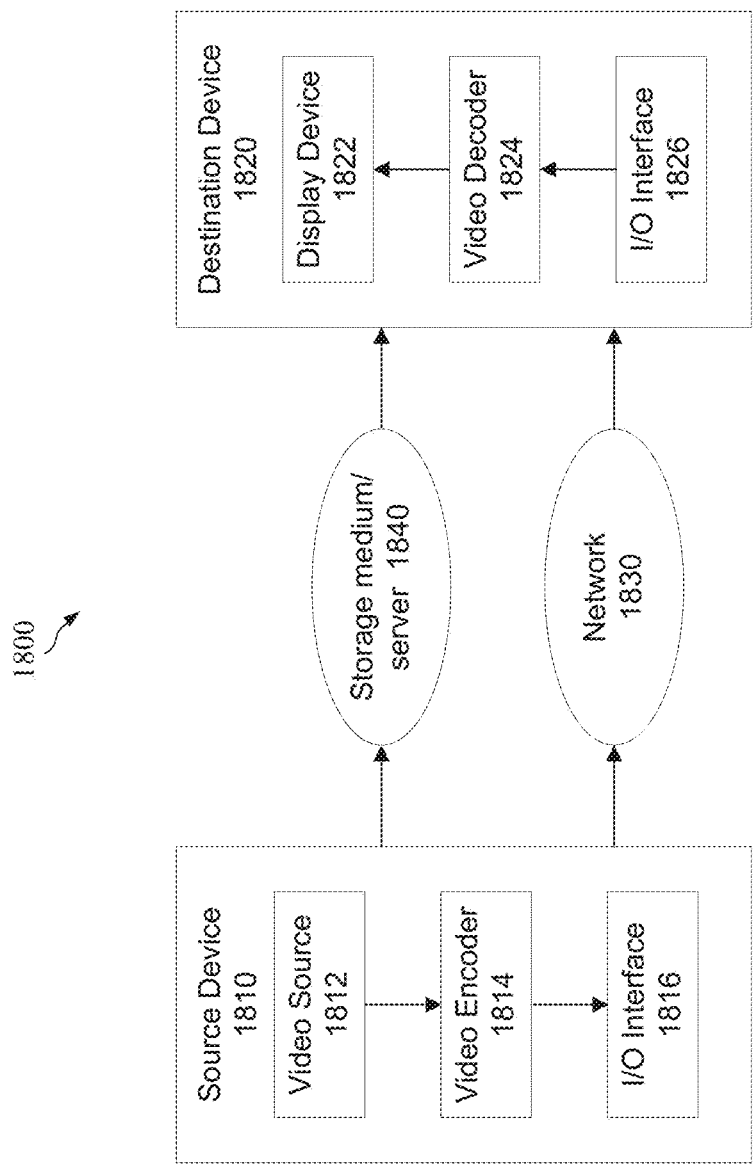
FIG. 18 is a block diagram that illustrates an example video coding system.

FIG. 18 is a block diagram that illustrates an example video coding system 1800 that may utilize the techniques of this disclosure. As shown in FIG. 18, the video coding system 1800 may include a source device 1810 and a destination device 1820. Source device 1810 generates encoded video data which may be referred to as a video encoding device. Destination device 1820 may decode the encoded video data generated by source device 1810 which may be referred to as a video decoding device.

Source device 1810 may include a video source 1812, a video encoder 1814, and an input/output (I/O) interface 1816.

Video source 1812 may include a source such as a video capture device, an interface to receive video data from a video content provider, and/or a computer graphics system for generating video data, or a combination of such sources. The video data may comprise one or more pictures. Video encoder 1814 encodes the video data from video source 1812 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1816 may include a modulator/demodulator (modem) and/or a transmitter. The encoded video data may be transmitted directly to destination device 1820 via I/O interface 1816 through network 1830. The encoded video data may also be stored onto a storage medium/server 1840 for access by destination device 1820.

Destination device 1820 may include an I/O interface 1826, a video decoder 1824, and a display device 1822.

I/O interface 1826 may include a receiver and/or a modem. I/O interface 1826 may acquire encoded video data from the source device 1810 or the storage medium/server 1840. Video decoder 1824 may decode the encoded video data. Display device 1822 may display the decoded video data to a user. Display device 1822 may be integrated with the destination device 1820, or may be external to destination device 1820 which may be configured to interface with an external display device.

Video encoder 1814 and video decoder 1824 may operate according to a video compression standard, such as the High Efficiency Video Coding (HEVC) standard, Versatile Video Coding (VVC) standard, and other current and/or further standards.

Figure 19:
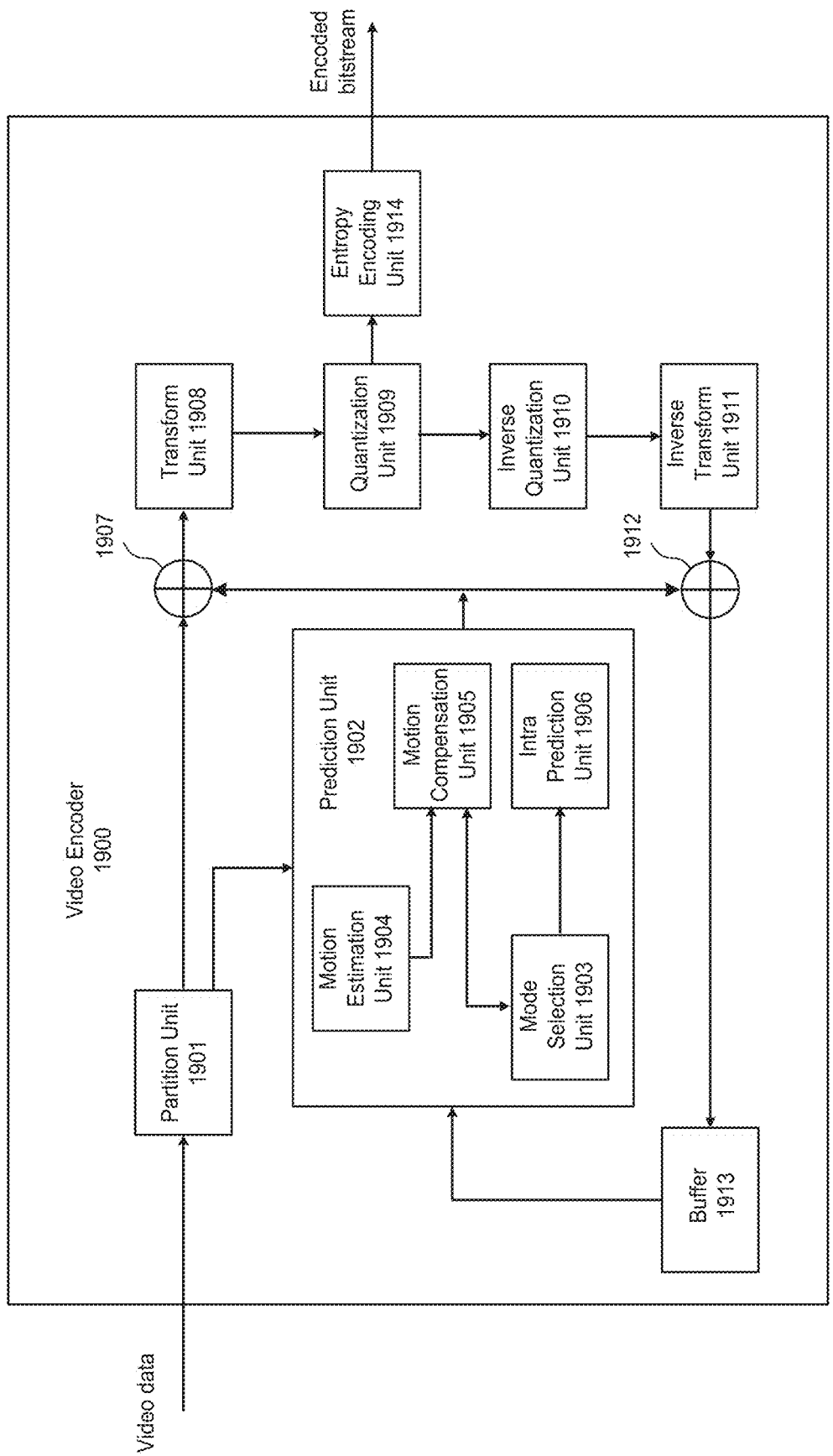
FIG. 19 is a block diagram illustrating an example of video encoder.

FIG. 19 is a block diagram illustrating an example of video encoder 1900, which may be video encoder 1814 in the video coding system 1800 illustrated in FIG. 18.

Video encoder 1900 may be configured to perform any or all of the techniques of this disclosure. In the example of FIG. 19, video encoder 1900 includes a plurality of functional components. The techniques described in this disclosure may be shared among the various components of video encoder 1900. In some examples, a processor may be configured to perform any or all of the techniques described in this disclosure.

The functional components of video encoder 1900 may include a partition unit 1901, a prediction unit 1902 which may include a mode select unit 1903, a motion estimation unit 1904, a motion compensation unit 1905 and an intra prediction unit 1906, a residual generation unit 1907, a transform unit 1908, a quantization unit 1909, an inverse quantization unit 1910, an inverse transform unit 1911, a reconstruction unit 1912, a buffer 1913, and an entropy encoding unit 1914.

In other examples, video encoder 1900 may include more, fewer, or different functional components. In an example, prediction unit 1902 may include an intra block copy (IBC) unit. The IBC unit may perform prediction in an IBC mode in which at least one reference picture is a picture where the current video block is located.

Furthermore, some components, such as motion estimation unit 1904 and motion compensation unit 1905 may be highly integrated, but are represented in the example of FIG. 19 separately for purposes of explanation.

Partition unit 1901 may partition a picture into one or more video blocks. Video encoder 1814 and video decoder 1824 of FIG. 18 may support various video block sizes.

Mode select unit 1903 may select one of the coding modes, intra or inter, e.g., based on error results, and provide the resulting intra- or inter-coded block to a residual generation unit 1907 to generate residual block data and to a reconstruction unit 1912 to reconstruct the encoded block for use as a reference picture. In some examples, mode select unit 1903 may select a combination of intra and inter prediction (CIIP) mode in which the prediction is based on an inter prediction signal and an intra prediction signal. Mode select unit 1903 may also select a resolution for a motion vector (e.g., a sub-pixel or integer pixel precision) for the block in the case of inter-prediction.

To perform inter prediction on a current video block, motion estimation unit 1904 may generate motion information for the current video block by comparing one or more reference frames from buffer 1913 to the current video block. Motion compensation unit 1905 may determine a predicted video block for the current video block based on the motion information and decoded samples of pictures from buffer 1913 other than the picture associated with the current video block.

Motion estimation unit 1904 and motion compensation unit 1905 may perform different operations for a current video block, for example, depending on whether the current video block is in an I slice, a P slice, or a B slice. I-slices (or I-frames) are the least compressible but don't require other video frames to decode. S-slices (or P-frames) can use data from previous frames to decompress and are more compressible than I-frames. B-slices (or B-frames) can use both previous and forward frames for data reference to get the highest amount of data compression.

In some examples, motion estimation unit 1904 may perform uni-directional prediction for the current video block, and motion estimation unit 1904 may search reference pictures of list 0 or list 1 for a reference video block for the current video block. Motion estimation unit 1904 may then generate a reference index that indicates the reference picture in list 0 or list 1 that contains the reference video block and a motion vector that indicates a spatial displacement between the current video block and the reference video block. Motion estimation unit 1904 may output the reference index, a prediction direction indicator, and the motion vector as the motion information of the current video block. Motion compensation unit 1905 may generate the predicted video block of the current block based on the reference video block indicated by the motion information of the current video block.

In other examples, motion estimation unit 1904 may perform bi-directional prediction for the current video block, motion estimation unit 1904 may search the reference pictures in list 0 for a reference video block for the current video block and may also search the reference pictures in list 1 for another reference video block for the current video block. Motion estimation unit 1904 may then generate reference indexes that indicate the reference pictures in list 0 and list 1 containing the reference video blocks and motion vectors that indicate spatial displacements between the reference video blocks and the current video block. Motion estimation unit 1904 may output the reference indexes and the motion vectors of the current video block as the motion information of the current video block. Motion compensation unit 1905 may generate the predicted video block of the current video block based on the reference video blocks indicated by the motion information of the current video block.

In some examples, motion estimation unit 1904 may output a full set of motion information for decoding processing of a decoder.

In some examples, motion estimation unit 1904 may not output a full set of motion information for the current video. Rather, motion estimation unit 1904 may signal the motion information of the current video block with reference to the motion information of another video block. For example, motion estimation unit 1904 may determine that the motion information of the current video block is sufficiently similar to the motion information of a neighboring video block.

In one example, motion estimation unit 1904 may indicate, in a syntax structure associated with the current video block, a value that indicates to the video decoder 1824 that the current video block has the same motion information as another video block.

In another example, motion estimation unit 1904 may identify, in a syntax structure associated with the current video block, another video block and a motion vector difference (MVD). The motion vector difference indicates a difference between the motion vector of the current video block and the motion vector of the indicated video block. The video decoder 1824 may use the motion vector of the indicated video block and the motion vector difference to determine the motion vector of the current video block.

As discussed above, video encoder 1814 may predictively signal the motion vector. Two examples of predictive signaling techniques that may be implemented by video encoder 1814 include advanced motion vector prediction (AMVP) and merge mode signaling.

Intra prediction unit 1906 may perform intra prediction on the current video block. When intra prediction unit 1906 performs intra prediction on the current video block, intra prediction unit 1906 may generate prediction data for the current video block based on decoded samples of other video blocks in the same picture. The prediction data for the current video block may include a predicted video block and various syntax elements.

Residual generation unit 1907 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 1907 may not perform the subtracting operation.

Transform unit 1908 may generate one or more transform coefficient video blocks for the current video block by applying one or more transforms to a residual video block associated with the current video block.

After transform unit 1908 generates a transform coefficient video block associated with the current video block, quantization unit 1909 may quantize the transform coefficient video block associated with the current video block based on one or more quantization parameter (QP) values associated with the current video block.

Inverse quantization unit 1910 and inverse transform unit 1911 may apply inverse quantization and inverse transforms to the transform coefficient video block, respectively, to reconstruct a residual video block from the transform coefficient video block. Reconstruction unit 1912 may add the reconstructed residual video block to corresponding samples from one or more predicted video blocks generated by the prediction unit 1902 to produce a reconstructed video block associated with the current block for storage in the buffer 1913.

After reconstruction unit 1912 reconstructs the video block, loop filtering operation may be performed to reduce video blocking artifacts in the video block.

Entropy encoding unit 1914 may receive data from other functional components of the video encoder 1900. When entropy encoding unit 1914 receives the data, entropy encoding unit 1914 may perform one or more entropy encoding operations to generate entropy encoded data and output a bitstream that includes the entropy encoded data.

Figure 20:
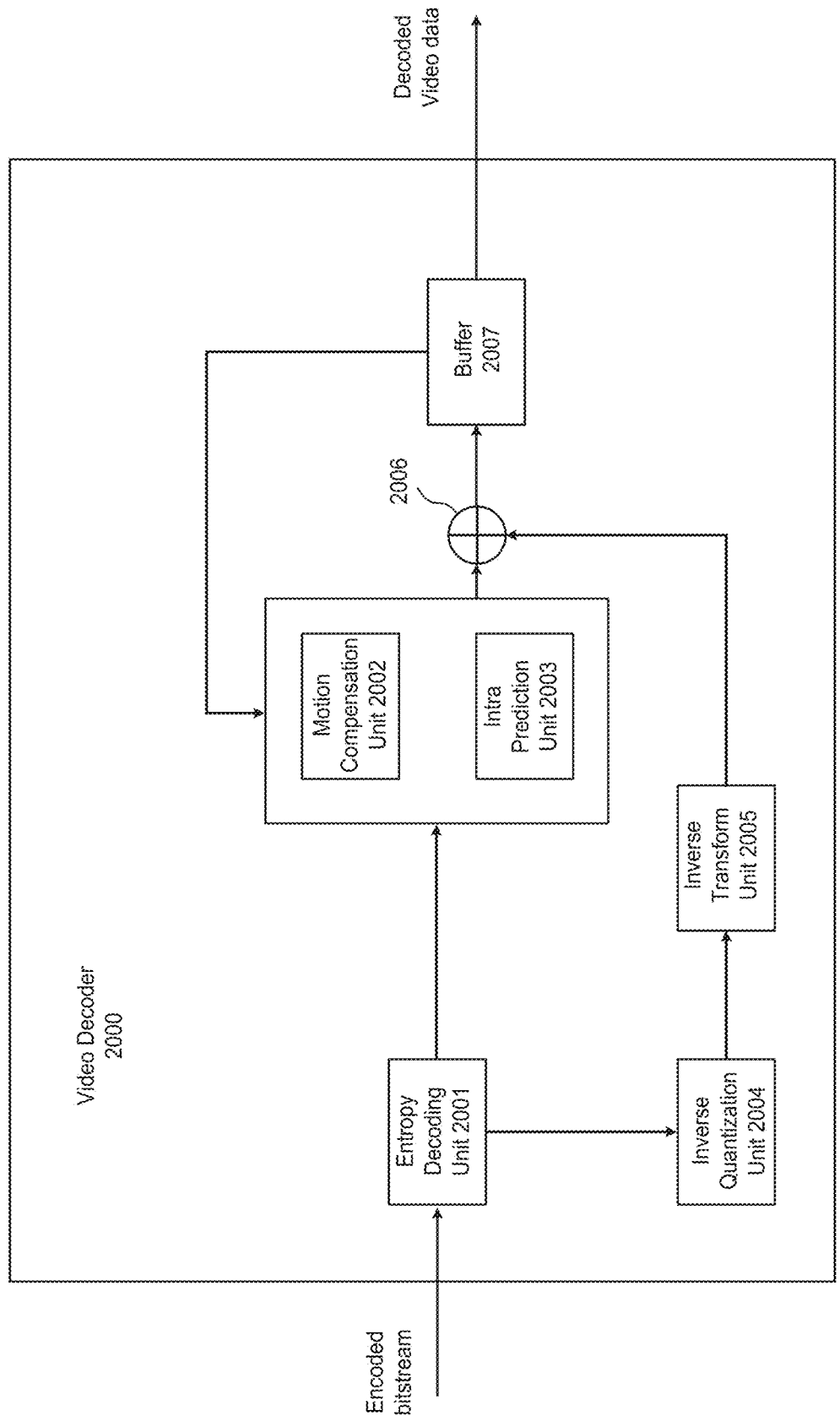
FIG. 20 is a block diagram illustrating an example of video decoder.

FIG. 20 is a block diagram illustrating an example of video decoder 2000, which may be video decoder 1824 in the video coding system 1800 illustrated in FIG. 18.

The video decoder 2000 may be configured to perform any or all of the techniques of this disclosure. In the example of FIG. 20, the video decoder 2000 includes a plurality of functional components. The techniques described in this disclosure may be shared among the various components of the video decoder 2000. In some examples, a processor may be configured to perform any or all of the techniques described in this disclosure.

In the example of FIG. 20, video decoder 2000 includes an entropy decoding unit 2001, a motion compensation unit 2002, an intra prediction unit 2003, an inverse quantization unit 2004, an inverse transformation unit 2005, and a reconstruction unit 2006 and a buffer 2007. Video decoder 2000 may, in some examples, perform a decoding pass generally reciprocal to the encoding pass described with respect to video encoder 1814 (FIG. 18).

Entropy decoding unit 2001 may retrieve an encoded bitstream. The encoded bitstream may include entropy coded video data (e.g., encoded blocks of video data). Entropy decoding unit 2001 may decode the entropy coded video data, and from the entropy decoded video data, motion compensation unit 2002 may determine motion information including motion vectors, motion vector precision, reference picture list indexes, and other motion information. Motion compensation unit 2002 may, for example, determine such information by performing the AMVP and merge mode signaling.

Motion compensation unit 2002 may produce motion compensated blocks, possibly performing interpolation based on interpolation filters. Identifiers for interpolation filters to be used with sub-pixel precision may be included in the syntax elements.

Motion compensation unit 2002 may use interpolation filters as used by video encoder 1814 during encoding of the video block to calculate interpolated values for sub-integer pixels of a reference block. Motion compensation unit 2002 may determine the interpolation filters used by video encoder 1814 according to received syntax information and use the interpolation filters to produce predictive blocks.

Motion compensation unit 2002 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 2003 may use intra prediction modes for example received in the bitstream to form a prediction block from spatially adjacent blocks. Inverse quantization unit 2004 inverse quantizes, i.e., de-quantizes, the quantized video block coefficients provided in the bitstream and decoded by entropy decoding unit 2001. Inverse transform unit 2005 applies an inverse transform.

Reconstruction unit 2006 may sum the residual blocks with the corresponding prediction blocks generated by motion compensation unit 2002 or intra-prediction unit 2003 to form decoded blocks. If desired, a deblocking filter may also be applied to filter the decoded blocks in order to remove blockiness artifacts. The decoded video blocks are then stored in buffer 2007, which provides reference blocks for subsequent motion compensation/intra prediction and also produces decoded video for presentation on a display device.

Figure 21:
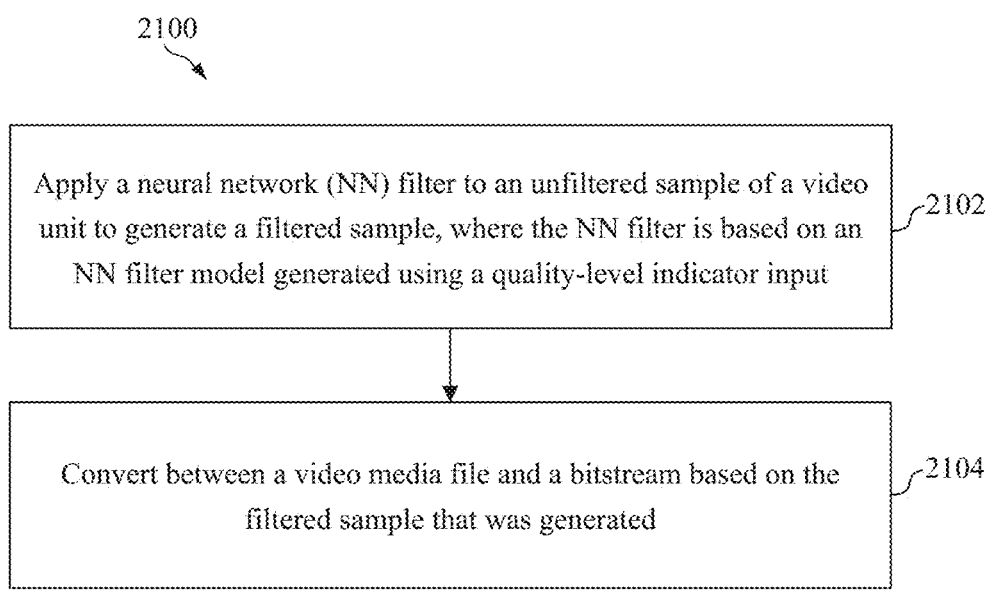
FIG. 21 is a method for coding video data according to an embodiment of the disclosure.

FIG. 21 is a method 2100 for coding video data according to an embodiment of the disclosure. The method 2100 may be performed by a coding apparatus (e.g., an encoder) having a processor and a memory. The method 2100 may be implemented to provide a unified NN filter model, generated using at least one indicator (e.g., a quality-level indicator), as an input to a NN filter. Such a NN filter model may avoid training an individual CNN model for each quality level, thus avoiding creating a large number of such CNN models.

In block 2102, the coding apparatus applies a neural network (NN) filter to an unfiltered sample of a video unit to generate a filtered sample. The NN filter is based on an NN filter model generated using a quality-level indicator (QI) input. In an embodiment, an unfiltered sample is a sample (or pixel) that has not yet been subjected to any filtering process, or has not yet been sufficiently filtered. For example, the unfiltered sample has not been subjected to any NN filter. As another example, the unfiltered sample has not been subjected to an NN filter, an adaptive loop filter (ALF), a deblocking filter (DF), a sample adaptive offset (SAO) filter, or combinations thereof.

In block 2104, the coding apparatus converts between a video media file and a bitstream based on the filtered sample that was generated.

When implemented in an encoder, converting includes receiving a media file (e.g., a video unit) and encoding a filtered sample into a bitstream. When implemented in a decoder, converting includes receiving a bitstream including a filtered sample, and decoding the bitstream to obtain the filtered sample.

In an embodiment, the method 2100 may utilize or incorporate one or more of the features or processes of the other methods disclosed herein.

In one example, a non-transitory computer readable medium stores a bitstream of a video that is generated by a method, such as all or part of the method 2100, performed by a video processing apparatus (e.g., video processing apparatus 1700, described above). For example, the bitstream may be generated by applying a NN filter to an unfiltered sample of a video unit to generate a filtered sample. As described above, the NN filter is based on an NN filter model generated using a quality-level indicator (QI) input, and the bitstream is generated based on the filtered sample.

A listing of solutions preferred by some embodiments is provided next.

The following solutions show example embodiments of techniques discussed in the present disclosure (e.g., Example 1).

1. A method of video processing, comprising: determining, for a conversion between a video unit of a video and a bitstream of the video, a parameter of an in-loop filter applied to the video unit according to a rule; and performing the conversion based on the determining, wherein the determining is based on a quality-level indicator (QI) input.

2. The method of claim 1, wherein the QI of the video unit is a quantization parameter of the video unit.

3. The method of claim 1, wherein the QI of the video unit is a quantization parameter value for the video.

4. The method of claim 1, wherein the QI of the video unit is a quantization step applied to the video unit.

5. The method of claim 1, wherein the conversion is performed by tiling the QI indicator input into a two-dimensional array of same size as the video unit and used as an input plane for the determining.

6. The method of any of claims 1-5, wherein the QI indicator input is indicated in the bitstream.

7. The method of claim 1, wherein the determining uses a function of the QI indicator.

The following solutions show example embodiments of techniques discussed in the previous section (e.g., Example 2).

8. A method of video processing, comprising: constructing, for a conversion between a video unit of a video and a bitstream of the video, a list of filtering candidates applicable to in-loop filtering of the video units according to a rule; and performing the conversion based on the determining; wherein the rule specifies that at least one entry in the list is based on a computational neural network (CNN) model.

9. The method of claim 8, wherein the list is constructed responsive to a coding statistics of the video unit.

10. The method of claim 9, wherein the coding statistics includes a ratio of a first group video samples related to the video unit that are coded using a predetermined video coding tool and samples of the video unit, called tool X.

11. The method of claim 10, wherein tool X includes intra prediction, palette prediction or intra-block copy prediction mode.

12. The method of any of claims 8-11, wherein the rule is further responsive to a coding condition of the video unit.

13. The method of claim 12, wherein the coding condition is that the video unit belongs to luma component of the video.

14. The method of claim 12, wherein the coding condition is that the video unit belongs to a certain temporal layer of the video.

15. The method of claim 10, wherein the first group of video samples is in in a picture that includes the video unit.

16. The method of claim 10, wherein the first group of video samples is in in one or more pictures that are different from a picture that includes the video unit.

17. The method of any of claims 1-16, wherein the video unit comprises a coding unit, a transform unit, a prediction unit, a slice or a subpicture.

18. The method of any of claims 1-16, wherein the video unit is a coding block or a video slice or a video picture or a video tile or a video subpicture.

19. The method of any of claims 1-18, wherein the conversion comprises generating the video from the bitstream or generating the bitstream from the video.

20. A video decoding apparatus comprising a processor configured to implement a method recited in one or more of claims 1 to 19.

21. A video encoding apparatus comprising a processor configured to implement a method recited in one or more of claims 1 to 19.

22. A computer program product having computer code stored thereon, the code, when executed by a processor, causes the processor to implement a method recited in any of claims 1 to 19.

23. A method, an apparatus, or a bitstream generated according to a disclosed method or a system described in the present document.

The following documents are incorporated by reference in their entirety:

[1] Johannes Ballé, Valero Laparra, and Eero P Simoncelli, "End-to-end optimization of nonlinear transform codes for perceptual quality," PCS IEEE (2016), 1-5.

[2] Lucas Theis, Wenzhe Shi, Andrew Cunningham, and Ferenc Huszár, "Lossy image compression with compressive autoencoders," arXiv preprint arXiv:1703.00395 (2017).

[3] Jiahao Li, Bin Li, Jizheng Xu, Ruiqin Xiong, and Wen Gao, "Fully Connected Network-Based Intra Prediction for Image Coding, "IEEE Transactions on Image Processing" 27, 7 (2018), 3236-3247.

[4] Yuanying Dai, Dong Liu, and Feng Wu, "A convolutional neural network approach for post-processing in HEVC intra coding," MMM. Springer, 28-39.

[5] Rui Song, Dong Liu, Houqiang Li, and Feng Wu, "Neural network-based arithmetic coding of intra prediction modes in HEVC," VCIP IEEE (2017), 1-4.

[6] J. Pfaff, P. Helle, D. Maniry, S. Kaltenstadler, W. Samek, H. Schwarz, D. Marpe, and T. Wiegand, "Neural network based intra prediction for video coding," Applications of Digital Image Processing XLI, Vol. 10752. International Society for Optics and Photonics, 1075213 (2018).

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disk read-only memory (CD ROM) and digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method implemented by a video coding apparatus, comprising:
    applying a neural network (NN) filter to an unfiltered sample of a video unit to generate a filtered sample, wherein the NN filter is based on an NN filter model generated using a quality-level indicator (QI) input; and
    converting between a video media file and a bitstream based on the filtered sample that was generated.

2. The method of claim 1, wherein the QI input comprises a quantization parameter (QP) of the video unit.

3. The method of claim 1, wherein the QI input comprises a quantization parameter (QP) of a sequence that includes the video unit.

4. The method of claim 1, wherein the QI input comprises a quantization parameter (QP) of a picture or slice that includes the video unit.

5. The method of claim 1, wherein the QI input comprises an output of a quantization process applied to the video unit, wherein the quantization process is based on a quantization parameter (QP) of the video unit, a QP of a sequence that includes the video unit, or a QP of a picture or slice that includes the video unit.

6. The method of claim 1, further comprising spanning the quality-level indicator into a two-dimensional array having a same size as the video unit, wherein the two-dimensional array is an additional input plane to the NN filter.

7. The method of claim 6, wherein the video unit is a coding tree unit (CTU) or a coding unit (CU).

8. The method of claim 1, wherein the QI input is fed into a plurality of fully-connected layers of the NN filter to expand the QI input into a one-dimensional vector, and wherein elements of the one-dimensional vector are channel-wise scaling factors used to recalibrate features maps of the NN filter model.

9. The method of claim 8, wherein the feature maps of the NN filter model are given by $f \in R^{N \times W \times H}$, where N represents the channel numbers, W represents the channel width, and H represents the channel height, wherein the one-dimensional vector provided by the fully-connected layers is represented by $S \in R^N$, and wherein the recalibrated feature maps are generated according to $F^{i,j,k} = f^{i,j,k} \times S^i$, $1 \leq i \leq N$, $1 \leq j \leq W$, $1 \leq k \leq H$, where F represents the recalibrated feature maps.

10. The method of claim 1, further comprising signaling the quality-level indicator to a decoder using one selected from the group consisting of: a sequence parameter set (SPS), a picture parameter set (PPS), a picture header, a slice header, a coding tree unit (CTU), and a coding unit (CU).

11. The method of claim 1, wherein the video unit comprises first and second color components, wherein the QI input indicates a quality of the first color component, and wherein the NN filter is applied to the first and second color components to generate the filtered sample.

12. The method of claim 1, wherein the video unit comprises first and second color components, wherein the QI input comprises a first QI that indicates a quality of the first color component and a second QI that indicates a quality of the second color component, and wherein the first QI is applied to the first color component and the second QI is applied to the second color component to generate the filtered sample.

13. The method of claim 1, wherein the video unit comprises first and second color components, wherein the QI input indicates a quality of the first color component, and wherein the NN filter is applied only to the first color component to generate the filtered sample.

14. The method of claim 1, wherein the QI indicates a quality of a region or picture that includes the video unit.

15. The method of claim 1, wherein the QI indicates a quality of a region or picture that does not include the video unit.

16. The method of claim 15, wherein the video unit refers to the region or picture.

17. The method of claim 1, wherein the conversion comprises generating the bitstream according to the video media file.

18. The method of claim 1, wherein the conversion comprises parsing the bitstream to obtain the video media file.

19. An apparatus for coding video data comprising a processor and a non-transitory memory with instructions thereon, wherein the instructions upon execution by the processor cause the processor to:

apply a neural network (NN) filter to an unfiltered sample of a video unit to generate a filtered sample, wherein the NN filter is based on an NN filter model generated using a quality-level indicator (QI) input; and convert between a video media file and a bitstream based on the filtered sample that was generated.

20. A non-transitory computer readable medium storing a bitstream of a video that is generated by a method performed by a video processing apparatus, wherein the method comprises:

applying a neural network (NN) filter to an unfiltered sample of a video unit to generate a filtered sample, wherein the NN filter is based on an NN filter model generated using a quality-level indicator (QI) input; and generating the bitstream based on the filtered sample that was generated.

* * * * *